(12) United States Patent
Seki et al.

(10) Patent No.: US 10,589,600 B2
(45) Date of Patent: Mar. 17, 2020

(54) VEHICULAR AIR CONDITIONER

(71) Applicant: HONDA MOTOR CO., LTD., Tokyo (JP)

(72) Inventors: Kazuhiko Seki, Wako (JP); Keisuke Nakamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 45 days.

(21) Appl. No.: 15/620,007

(22) Filed: Jun. 12, 2017

(65) Prior Publication Data
US 2017/0355247 A1 Dec. 14, 2017

(30) Foreign Application Priority Data

Jun. 14, 2016 (JP) .................... 2016-117814

(51) Int. Cl.
*B60H 1/32* (2006.01)
*B60H 1/00* (2006.01)

(52) U.S. Cl.
CPC ......... *B60H 1/323* (2013.01); *B60H 1/00921* (2013.01); *B60H 2001/00178* (2013.01); *B60H 2001/00942* (2013.01)

(58) Field of Classification Search
CPC ............... B60H 1/00921; B60H 1/323; B60H 2001/00942; B60H 2001/00178;
(Continued)

(56) References Cited

U.S. PATENT DOCUMENTS 5,975,191 A * 11/1999 Ohashi ............... B60H 1/00035
165/43
6,118,099 A * 9/2000 Lake .................. B60H 1/00907
165/43
(Continued)

FOREIGN PATENT DOCUMENTS

JP   S57-178913 A   11/1982
JP   2003-25826 A    1/2003
(Continued)

OTHER PUBLICATIONS

Office Action dated Nov. 26, 2019, issued in JP application No. 2016-117814, with English translation. (10 pages).

*Primary Examiner* — Ljiljana V. Ciric
(74) *Attorney, Agent, or Firm* — Westerman, Hattori, Daniels & Adrian, LLP

(57) ABSTRACT

An auxiliary heat exchanger separated from a main heat exchanger is disposed at the position facing a heat exhausting passage. The auxiliary heat exchanger switches among an inside air heat exchanging state in which a condenser performs heat exchange with the air inside the vehicle interior, an outside air heat exchanging state in which the condenser performs heat exchange with the air outside the vehicle interior, and a ventilation heat exchanging state in which the condenser performs heat exchange with the ventilation air. The auxiliary heat exchanger switches among an inside air heat exchanging state in which the evaporator performs heat exchange with the air inside the vehicle interior, an outside air heat exchanging state in which the evaporator performs heat exchange with the air outside the vehicle interior, and a ventilation heat exchanging state in which the evaporator performs heat exchange with the ventilation air.

8 Claims, 13 Drawing Sheets

(58) Field of Classification Search
CPC ...... B60H 2001/00078; B60H 1/00335; B60H 1/00021
See application file for complete search history.

(56) References Cited

U.S. PATENT DOCUMENTS

| | | | | |
|---|---|---|---|---|
| 7,237,397 | B2* | 7/2007 | Allen | B60H 1/00378 62/236 |
| 9,481,222 | B2* | 11/2016 | Nakaya | B60H 1/00028 |
| 2005/0198986 | A1 | 9/2005 | Allen | |
| 2008/0085672 | A1* | 4/2008 | Creed | B60H 1/00207 454/69 |
| 2014/0318170 | A1* | 10/2014 | Katoh | F28F 9/26 62/324.5 |
| 2015/0122473 | A1* | 5/2015 | Nii | B60H 1/0005 165/202 |
| 2015/0128626 | A1* | 5/2015 | Guigou | B60H 1/00278 62/115 |
| 2016/0001628 | A1* | 1/2016 | Kakizaki | B60H 1/00835 62/157 |
| 2016/0031291 | A1* | 2/2016 | Enomoto | B60H 1/00385 62/179 |
| 2016/0339767 | A1* | 11/2016 | Enomoto | F25B 25/005 |
| 2017/0217283 | A1* | 8/2017 | Uehara | B60H 1/00849 |
| 2018/0141410 | A1* | 5/2018 | Kami | B60H 1/22 |
| 2019/0092121 | A1* | 3/2019 | Tan | B60H 1/00385 |
| 2019/0143790 | A1* | 5/2019 | Xiong | B60H 1/323 165/202 |
| 2019/0152293 | A1* | 5/2019 | Tan | B60H 1/22 |
| 2019/0152294 | A1* | 5/2019 | Peng | B60H 1/00278 |
| 2019/0202258 | A1* | 7/2019 | Peng | B60H 1/00 |
| 2019/0219315 | A1* | 7/2019 | Michael | B60H 1/00914 |

FOREIGN PATENT DOCUMENTS

| | | |
|---|---|---|
| JP | 2011-51466 A | 3/2011 |
| JP | 5186422 B2 | 4/2013 |
| JP | 2013-141932 A | 7/2013 |
| JP | 2013-209006 A | 10/2013 |
| JP | 2013-212829 A | 10/2013 |
| JP | 2014-34324 A | 2/2014 |
| WO | 2014/156585 A1 | 10/2014 |

* cited by examiner

US 10,589,600 B2

VEHICULAR AIR CONDITIONER

CROSS REFERENCES TO RELATED APPLICATIONS

The present application claims priority under 35 U.S.C. § 119 to Japanese Patent Application No. 2016-117814, filed Jun. 14, 2016, entitled "Vehicular Air Conditioner." The contents of this application are incorporated herein by reference in their entirety.

TECHNICAL FIELD

The present disclosure relates to vehicular air conditioner.

BACKGROUND

There is a widely known vehicular air conditioner which enhances the heat exchanging efficiency at the runtime of heating of the main heat exchanger by recovering the ventilation heat exhausted from the inside of the vehicle interior to the outside of the vehicle interior (for example, see Japanese Laid-Open Patent Publication No. 2011-51466, and the publication of Japanese Patent No. 5186422).

A vehicular air conditioner mentioned in Japanese Laid-Open Patent Publication No. 2011-51466 is configured such that in a main heat exchanger using a heat pump circuit, an auxiliary heat exchanging portion for recovering the exhausted heat is branched and connected to a downstream side of an expansion valve in a refrigerant passage in a heat pump circuit. The auxiliary heat exchanging portion is configured such that a heat exchanger for heat exchanging with the air passing through a heat exhausting passage is disposed in the ventilation heat exhausting passage which exhausts the air inside the vehicle interior to the outside of the vehicle interior. The heat generator of the auxiliary heat exchanging portion supplies a refrigerant absorbed the heat from the air passing through the heat exhausting passage to the upstream portion of an indoor heat exchanger in the refrigerant passage of the main heat exchanger. Accordingly, the refrigerant supplied to the indoor heat exchanger recovers the hot heat from the ventilation air, which improves the heating efficiency.

Moreover in a vehicular air conditioner mentioned in the publication of Japanese Patent No. 5186422, an auxiliary indoor heat exchanger of an exhaust heat recovering device is disposed with a main indoor heat exchanger in the air introducing duct of a main heat exchanger. The exhaust heat recovering device has a heat pump circuit in which a refrigerant circulates between the auxiliary indoor heat exchanger and the ventilation heat exchanger. The ventilation heat exchanger is disposed in a ventilation heat exhausting passage which exhausts the air from inside of the vehicle interior to the outside of the vehicle interior. The exhaust heat recovering device supplies a refrigerant absorbed by the ventilation heat exchanger to the auxiliary indoor heat exchanger in the air introducing duct, and heats an air passed through the air introducing duct by the auxiliary indoor heat exchanger. Accordingly, as for the vehicular air conditioner, the refrigerant supplied to the auxiliary indoor neat exchanger recovers the hot heat from the ventilation air, which improves the heating efficiency.

SUMMARY

In the vehicular air conditioner mentioned in Japanese Laid-Open Patent Publication No. 2011-51466, the heat generator of the auxiliary heat exchanging portion is disposed in the ventilation heat exhausting passage of the vehicle. The heat generator is connected to the main passage of the refrigerant of the main heat exchanger by piping. Accordingly, as for the vehicular air conditioner mentioned in Japanese Laid-Open Patent Publication No. 2011-51466, the length of piping which connects between the heat generator of the auxiliary heat exchanging portion and the main passage for the refrigerant of the main heat exchanger becomes longer. Due to the fact that the pressure loss and the heat loss by piping becomes larger, further improvement for increasing the energy utilization efficiency is required.

Moreover, in the vehicular air conditioner mentioned in the publication of Japanese Patent No. 5186422, the ventilation heat exchanger of the exhaust heat recovering device is disposed in the ventilation heat exhausting passage of the vehicle. The ventilation heat exchanger is connected to the auxiliary indoor heat exchanger inside the air introducing duct of the main heat exchanger by piping. Accordingly, as for the vehicular air conditioner mentioned in the publication of Japanese Patent No. 5186422, the length of piping which connects between the ventilation heat exchanger and the auxiliary indoor heat exchanger in the air introducing duct becomes longer. It is also preferable to reduce the pressure loss and the heat loss by piping.

Moreover, the vehicular air conditioners mentioned in Japanese Laid-Open Patent Publication No. 2011-51466, and the publication of Japanese Patent No. 5186422 can recover the hot heat energy of the ventilation heat exhausting passage at the runtime of heating operation of the vehicle. It is also preferable that the vehicular air conditioner can recover the cold heat energy of the ventilation heat exhausting passage at the runtime of the cooling operation of the vehicle.

It is preferable to provide a vehicular air conditioner which can recover the heat energy of the ventilation heat exhausting passage at any time of heating operation or cooling operation while suppresses the pressure loss and the heat loss, and can enhance the energy utilization efficiency.

A first aspect of the embodiments provides a vehicular air conditioner which has a hot heat generating portion (for example, an heating indoor heat exchanger 55 in the embodiment), a cold heat generating portion (for example, an evaporator 53 in the embodiment), and an introduced air switching portion (for example, a switching damper 37 in the embodiment) switching the air introduced to at least any one of the hot heat generating portion and the cold heat generating portion to any one of the inside air inside the vehicle interior and the outside air outside the vehicle interior, and also has a main heat exchanger (for example, a main heat exchanger 10 in the embodiment) in which the introduced air passes through at least any one of the hot heat generating portion or the cold heat generating portion, and or sends to the inside of the vehicle interior, a condenser (for example, a condenser 63 in the embodiment) radiating the heat of the refrigerant exhausted from a compressor for example, a compressor 66 in the embodiment) to the periphery, and an evaporator (for example, an evaporator 64 in the embodiment) inflating the refrigerant exhausted from the condenser by an expansion valve (for example, an expansion valve 67 in the embodiment) and then absorbing the peripheral heat to the inside, an auxiliary heat exchanger (for example, an auxiliary heat exchanger 60 in the embodiment) in which the condenser and the evaporator are formed in an integral block, simultaneously, which is separated from the main heat exchanger and is disposed at the position facing to a ventilation heat exhausting passage (for example, a heat exhausting passage 65 in the embodiment) of a vehicle, which selectively performs heat exchange of the indoor air with any one of the condenser or the evaporator and which exhausts the air-conditioned air to the inside of the vehicle interior depending on the operation mode, a control device (for example, control device 15 in the embodiment) controls the auxiliary heat exchanger, the auxiliary heat exchanger has condenser side heat exchange switching portions (for example, inside and outside air switching dampers 72C, 75C in the embodiment) which selectively switches any one of an inside air heat exchanging state in which the condenser performs heat exchange with the air inside the vehicle interior, or the outside air heat exchanging state in which the condenser performs heat exchange with the air outside the vehicle interior, and or a ventilation heat exchanging state in which the condenser performs heat exchange with the ventilation air exhausted from the outside of the vehicle interior through the heat exhausting passage, and evaporator side heat exchange switching portions (for example, inside and outside air switching dampers 72E, 75E in the embodiment) selectively switching any one of the inside air heat exchanging state in which the evaporator performs heat exchange with the air inside the vehicle interior, or an outside air heat exchanging state in which the evaporator performs heat exchange with the air outside the vehicle interior, and or a ventilation heat exchanging state in which the evaporator performs heat exchange with the ventilation air exhausted from the inside of the vehicle interior to the outside the vehicle interior through the heat exhausting passage, and the control device controls the condenser side heat exchange switching portion and evaporator side heat exchange switching portion depending on the operation mode.

The control device may control the condenser side heat exchange switching portion such that the condenser shifts to the inside air heat exchanging state, and controls the evaporator side heat exchange switching portion such that the evaporator in the outside air heat exchanging state in an operation mode performing heating operation in a state that the introduced air switching portion of the main heat exchanger introduces the inside air.

The control device may control the condenser side heat exchange switching portion such that the condenser shifts to the inside air heat exchanging state, and controls the evaporator side heat exchange switching portion such that the evaporator shifts to the ventilation heat exchanging state in the operation mode performing heating operation in a state that the introduced air switching portion of the main heat exchanger introduces the outside air.

The control device controls the evaporator side heat exchange switching portion such that the evaporator shifts to the inside air heat exchanging state, and controls the condenser side heat exchange switching portion such that the condenser shifts to the outside air heat exchanging state in an operation mode performing cooling operation in a state that the introduced air switching portion of the main heat exchanger introduces the inside air.

The control device may control the evaporator side heat exchange switching portion such that the evaporator shifts to the inside air heat exchanging state, and controls the condenser side heat exchange switching portion such that the condenser shifts to the ventilation heat exchanging state in an operation mode performing cooling operation in a state that the introduced air switching portion of the main heat exchanger introduces the outside air. In the above explanation of the exemplary embodiment, specific elements with their reference numerals are indicated by using brackets. These specific elements are presented as mere examples in order to facilitate understanding, and thus, should not be interpreted as any limitation to the accompanying claims.

According to one aspect of the present disclosure, meanwhile the air which is heat exchanged at the hot heat generating portion of the main heat exchanger flows to the inside of the vehicle interior at the runtime of heating operation, the condenser of the auxiliary heat exchanger shifts to the inside air heat exchanging state and the evaporator of the auxiliary heat exchanger shifts to the ventilation heat exchanging state. Accordingly, the auxiliary heat exchanger which is separately disposed from the main heat exchanger recovers the heat of the exhausting passage and can heat the air inside the vehicle interior. Moreover, meanwhile the air which is heat exchanged at the cold heat generating portion of the main heat exchanger flows to the inside of the vehicle interior at the runtime of the cooling operation, the evaporator of the auxiliary heat exchange shifts to the inside air heat exchanging state, and the condenser of the auxiliary heat exchanger shifts to the ventilation heat exchanging state. Accordingly, the auxiliary heat exchanger which is separately disposed from the main heat exchanger recovers the cold heat of the exhausting passage and can cool the air inside the vehicle interior.

Therefore, there is no need to connect the auxiliary heat exchanger to the main heat exchanger with a refrigerant piping. Accordingly, it is possible to suppress the pressure loss and the heat loss, and simultaneously to recover the heat energy of the ventilation heat exhausting passage at any runtime of heating operation or cooling operation. Therefore, the energy utilization efficiency can be enhanced by adopting the present disclosure.

DETAILED DESCRIPTION

Figure 1:
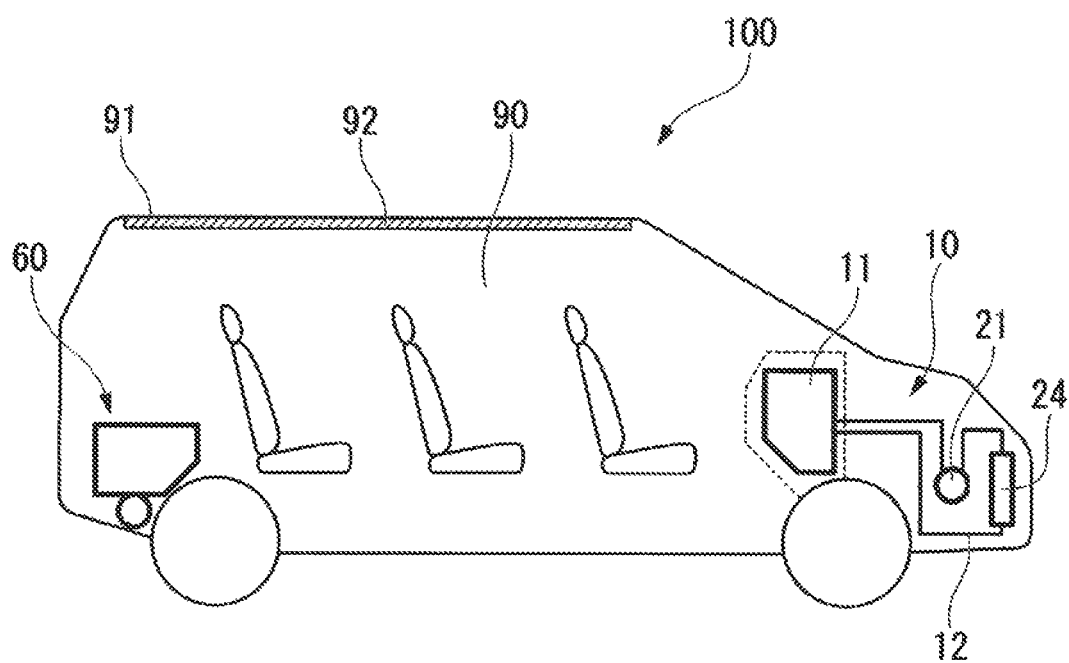
FIG. 1 is a schematically sectional view of the vehicle which adopts a vehicular air conditioner in the one embodiment in the present disclosure.

Hereinafter, the one embodiment in the present disclosure will be explained with reference to drawings. FIG. 1 is a schematically sectional view of a vehicle 100 which adopts a vehicular air conditioner in the one embodiment.

As shown in FIG. 1, a vehicular air conditioner 1 is mounted on the vehicle 100. The vehicular air conditioner has a main heat exchanger 10, an auxiliary heat exchanger 60 which is completely separated from the main heat exchanger 10. The main heat exchanger 10 is disposed in the front direction of a vehicle interior 90 (for example, an instrument panel and engine room). The auxiliary heat exchanger 60 is disposed at the position facing to a ventilation heat exhausting passage 65 (an indoor air exhausting passage) which is in the rear direction of the vehicle interior 90. Moreover, a solar panel 92 which is a solar power generator is disposed on a roof portion 91 of the vehicle.

Figure 2:
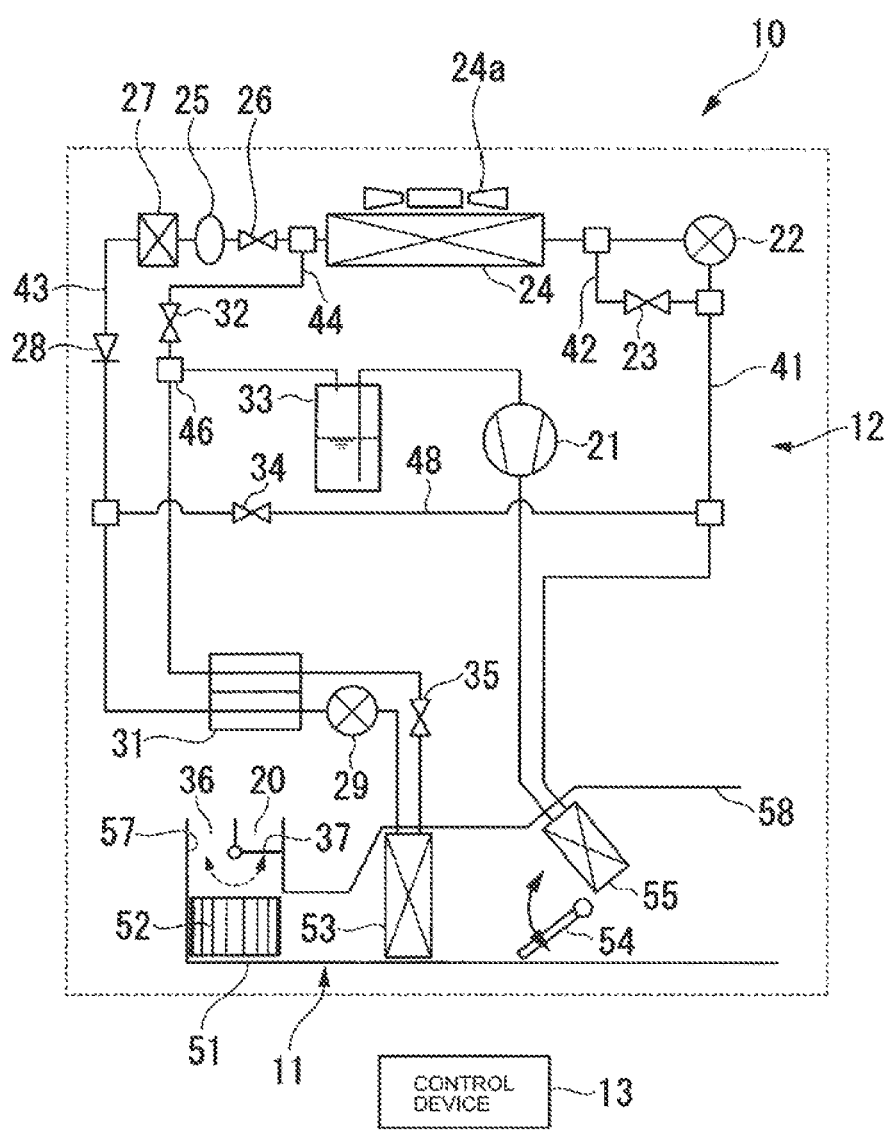
FIG. 2 is a diagram of the main heat exchanger in the one embodiment of the present disclosure.

FIG. 2 is a diagram of the main heat exchanger 10.

The main heat exchanger 10 mainly has an air conditioning unit 11, a refrigerating cycle 12 in which the refrigerant can circulate, and a control device 13.

The air conditioning unit 11 has a duct 51 in which the air-conditioned air flows, a blower 52 which is housed inside the duct 51, an evaporator 53, an air mix door 54, an heating indoor heat exchanger 55. The duct 51 has an air intake port 57 positioned in the upstream side of the flow direction of the air-conditioned air, and an air blow off port 58 positioned in the downstream side. The above mentioned blower 52, the evaporator 53, the air mix door 54, and the heating indoor heat exchanger 55 are disposed in this order from the upstream side to the downstream side of the flow direction.

For example, the blower 52 is driven according to a driving voltage which were applied by the control of the control device 13, and sends the introduced air taken through the air intake port 57 into the duct 51 to the downstream side. A switching damper 37 (an introduced air switching portion) switching an indoor passage 20 communicating with the inside of the vehicle interior and an outdoor passage 36 communicating with the outside of the vehicle interior are provided in the air intake port 57. For example, the switching damper 37 is formed so as to be rotatable by a driving means (not shown) which is driven by the control of the control device 13.

The evaporator 53 performs heat exchange between the low-pressure refrigerant which flow to the inside and the atmosphere inside the vehicle interior (inside the duct 51), and, for example, performs cooling the air-conditioned air which passes through the evaporator 53 by absorbing the heat when the refrigerant is evaporated.

The heating indoor heat exchanger 55 can radiate heat by the refrigerant in high temperature and high pressure which flows to the inside thereof, and for example heats the air-conditioned air passing through the heating indoor heat exchanger 55.

For example, the air mix door 54 is formed so as to be rotatable by the driving means (not shown) which is driven by the control of the control device 13. In concrete, the air mix door 54 rotates between the heating position (see FIG. 3) which opens a ventilation route (heating route) heading for the heating indoor heat exchanger 55 and the cooling position (see FIG. 4) which opens the ventilation route (cooling route) detouring the heating route in the duct 51.

For example, the refrigerating cycle 12 has the above mentioned evaporator 53 and the heating indoor heat exchanger 55, a compressor 21, an heating expansion valve 22, a bypass valve 23, an outdoor heat exchanger 24, a cooling valve 26, a receiver tank 25, a sub-condenser 27, a check valve 28, an cooling expansion valve 29, an cooling auxiliary heat exchanger 31, a heating valve 32, a gas-liquid separator 33, a dehumidifying valve 34, and an evaporating capacity control valve 35, and each component is connected through the refrigerant channel.

The compressor 21 is connected between the gas-liquid separator 33 and the heating indoor heat exchanger 55. For example, the compressor 21 is driven by the driving force of the driving means which is driven by the control of the control device 13, and sucks mainly gas part of the refrigerant from the gas-liquid separator 33, and simultaneously compresses and exhausts the refrigerant as a refrigerant in high temperature and high pressure to the above mentioned heating indoor heat exchanger 55.

The heating expansion valve 22 is a so-called throttle valve, expands and exhausts the refrigerant exhausted from the heating indoor heat exchanger 55 as a refrigerant in low temperature and low pressure in liquid phase rich spray state in two phases of gas-and-liquid and to the outdoor heat exchanger 24.

Moreover, a high pressure side main passage 41 is set as the passage which reaches from the exhausting portion of the compressor 21 to the heating expansion valve 22 through the heating indoor heat exchanger 55.

The bypass valve 23 is provided on a bypass passage 42 detouring the heating expansion valve 22 of the high pressure side main passage 41 and connected to the outdoor heat exchanger 24 in the downstream portion of the heating indoor heat exchanger 55. For example, the control device 13 performs switching control of the bypass valve. Moreover, the bypass valve 23 is in a close state at the runtime of heating operation, and is in an open state at the runtime of cooling operation.

Accordingly, for example, at the runtime of heating operation, the refrigerant exhausted from the heating indoor heat exchanger 55 flows into the outdoor heat exchanger 24 through the heating expansion valve 22 in a state that the refrigerant is in low temperature and low pressure.

Meanwhile, at the runtime of cooling operation, the refrigerant exhausted from the heating indoor heat exchanger 55 flows in a state that the refrigerant is in high temperature and high pressure into the outdoor heat exchanger 24 through the bypass valve 23.

The outdoor heat exchanger 24 performs heat exchange between the refrigerant which flows to the inside and the outdoor atmosphere. Moreover, a fan 24a which can blow to the outdoor heat exchanger 24 is disposed in the front direction of the outdoor heat exchanger 24. Moreover, for example, the fan 24a can be driven by the control of the control device 13.

The outdoor heat exchanger 24 can absorb the heat from the outdoor atmosphere by the refrigerant in low temperature and low pressure flows to the inside at the runtime of heating operation. For example, absorbing the heat from the outdoor atmosphere vaporizes the refrigerant.

Meanwhile, the outdoor heat exchanger 24 can radiate the heat to the outdoor atmosphere by the refrigerant in high temperature which flows to the inside at the runtime of cooling operation. For example, radiating the heat to the outdoor atmosphere and air-flow of the fan 24a cools the refrigerant.

The cooling valve 26 is disposed on a cooling main passage 43 which is connected to the downstream portion of the outdoor heat exchanger 24 of the refrigerant channel. For example, the control device 13 performs switching control of the cooling valve. The cooling valve 26 is in an open state at the runtime of cooling operation, and is in a close state at the runtime of heating operation.

The receiver tank 25 is disposed in the downstream side of the cooling valve 26 of the cooling main passage 43. The receiver tank 25 recovers the refrigerant in gas phase (gas part of the refrigerant) of the refrigerant which passes through the outdoor heat exchanger 24 and flows into the cooling main passage 43. Namely, the receiver tank 25 flows only the refrigerant in liquid phase (liquid part of the refrigerant) of the refrigerant which flows into the cooling main passage 43 to the downstream side of the cooling main passage 43.

The sub-condenser 27 is disposed in further downstream side than the receiver tank 25 of the cooling main passage 43, and performs heat exchange between the refrigerant which flows to the inside and the outdoor atmosphere.

The check valve 28 is disposed in further downstream side than the sub-condenser 27 of the cooling main passage 43. The check valve 28 ventilates the refrigerant which passes through the sub-condenser 27 to the downstream side at the runtime of cooling operation, and prevents the backflow of the refrigerant to further upstream side (the sub-condenser 27 side) than the check valve 28 of the cooling main passage 43 at the runtime of dehumidification operation.

The cooling expansion valve 29 is a so-called throttle valve, and is connected between the check valve 28 and an inflow pert of the evaporator 53 of the cooling main passage 43. For example, the cooling expansion valve 29 expands and exhausts the refrigerant which passes through the check valve 28 according to the valve opening which is controlled by the control device 13 to the evaporator 53 as the refrigerant in spray state in two phases of gas-and-liquid in low temperature and low pressure.

The cooling auxiliary heat exchanger 31 is disposed so as to straddle between the upstream portion positioned in further upstream side than the cooling expansion valve 29 of the cooling main passage 43 and the downstream portion positioned in further downstream side than the evaporator 53. The cooling auxiliary heat exchanger 31 performs heat exchange between the above mentioned upstream portion and the downstream portion at the runtime of cooling operation, and cools the refrigerant in the upstream portion before the refrigerant flows into the evaporator 53.

Moreover, the cooling main passage 43 in the present embodiment is a passage which is connected from the downstream portion of the outdoor heat exchanger 24 to the gas-liquid separator 33 through the cooling valve 26, the receiver tank 25, the sub-condenser 27, the check valve 28, the cooling auxiliary heat exchanger 31, the cooling expansion valve 29, the evaporator 53, and the evaporating capacity control valve 35.

The heating valve 32 is disposed on the heating bypass passage 44 which detours the cooling main passage 43 and connects the downstream portion of the outdoor heat exchanger 24 and the gas-liquid separator 33. For example, the control device 13 performs switching control of the heating valve 32. The heating valve 32 is in open state at the runtime of heating operation, and is in close state at the runtime of cooling operation.

The gas-liquid separator 33 is connected between a confluent portion 46 which connects a lower stream end of the cooling main passage 43 and a lower stream end of the heating bypass passage 44, and the above mentioned the compressor 21. The gas-liquid separator 33 separates the gas-liquid of the refrigerant exhausted from the confluent portion 46 such that the compressor 21 sucks mainly gas phase of the refrigerant.

The dehumidifying valve 34 is disposed on a dehumidifying channel 48 which connects the portion positioned in further downstream side than the check valve 28 of the cooling main passage 43 and the portion positioned in further the downstream side than the heating indoor heat exchanger 55 of the high pressure side main passage 41. For example, the control device 13 performs switching control of the dehumidifying valve. The dehumidifying valve 34 is in an open state at the runtime of dehumidification operation, and is in a close state at the runtime of other operations (cooling operation and heating operation).

The evaporating capacity control valve 35 is disposed between the evaporator 53 and the cooling auxiliary heat exchanger 31, in the cooling main passage 43. For example, the control device 13 performs switching control of the evaporating capacity control valve. The evaporating capacity control valve 35 is controlled such that the opening at the runtime of dehumidification operation is smaller than that at the runtime of cooling operation.

A heating refrigerant circuit in which the refrigerant circulates inside thereof at the runtime of heating operation, a cooling refrigerant circuit in which the refrigerant circulate inside thereof at the runtime of cooling operation are provided in the present embodiment. Both refrigerant circuits share the compressor 21, the outdoor heat exchanger 24, and the gas-liquid separator 33.

The heating refrigerant circuit has the high pressure side main passage 41 which passes through the heating indoor heat exchanger 55 and the heating expansion valve 22 and connects the exhausting portion of the compressor 21 and the upstream portion of the outdoor heat exchanger 24, and the heating bypass passage 44 which detours the cooling main passage 43 and connects the downstream portion of the outdoor heat exchanger 24 and the gas-liquid separator 33. Moreover, the cooling refrigerant circuit has the cooling main passage 43 which passes through the cooling expansion valve 29 and the evaporator 53 and connects the downstream portion of the outdoor heat exchanger 24 and the gas-liquid separator 33, and a passage which is configured with a part of the high pressure side main passage 41 passing through the heating indoor heat exchanger 55 and the bypass passage 42, detours the heating expansion valve 22, and connects the exhausting portion of the compressor 21 and the upstream portion of the outdoor heat exchanger 24.

Moreover, the control device 13 controls the operation of the main heat exchanger 10 based on command signals and the like which an operator inputs through for example an unillustrated switch and the like, which are disposed inside the vehicle interior. Moreover, the control device 13 performs switching control of the operation of the main heat exchanger 10 to heating operation, cooling operation, and dehumidification operation and the like.

Figure 3:
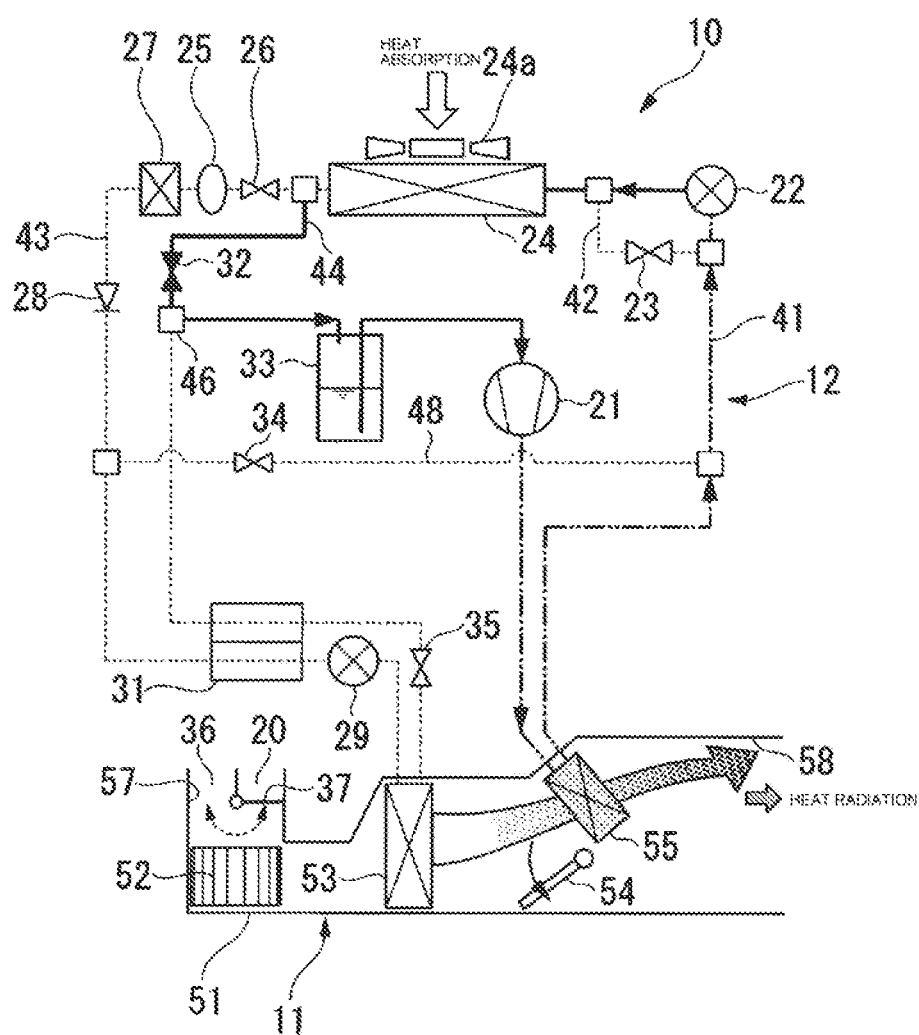
FIG. 3 is a diagram of the main heat exchanger in the one embodiment of the present disclosure, which shows the flow of the refrigerant and the air-conditioned air at the runtime of heating operation.
Figure 4:
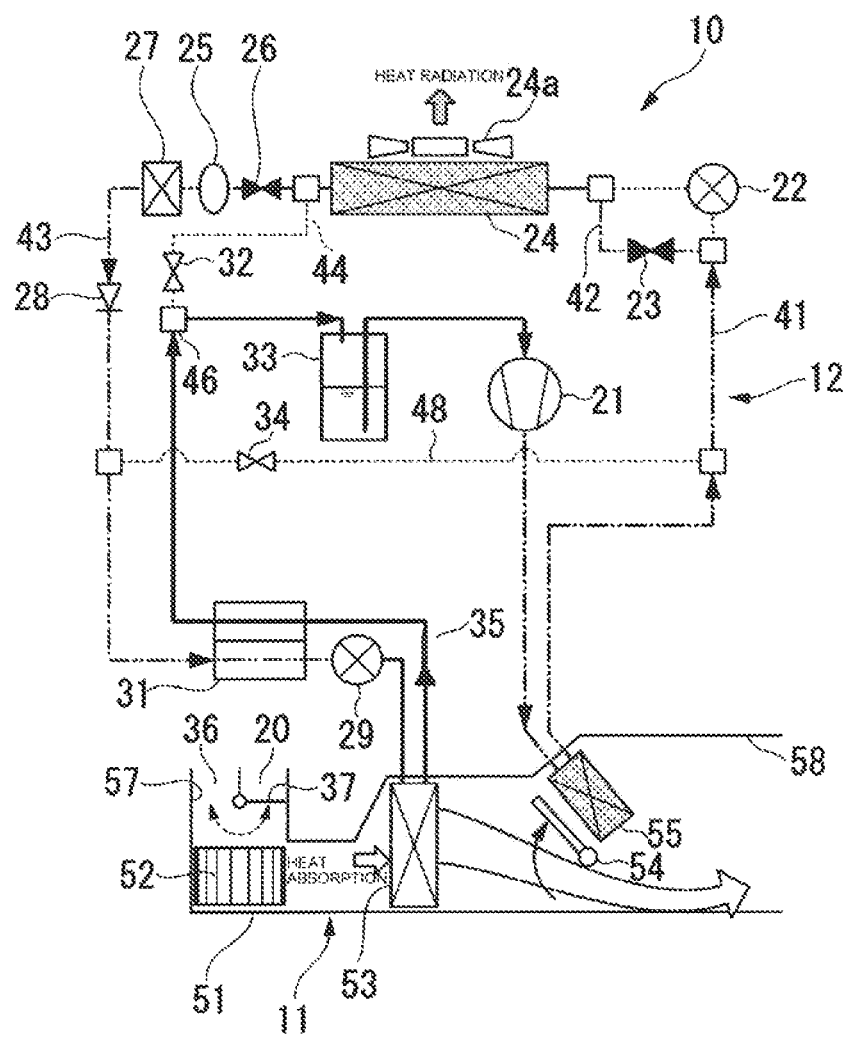
FIG. 4 is a diagram of the main heat exchanger in the one embodiment of the present disclosure, which shows the flow of the refrigerant and the air-conditioned air at the runtime of cooling operation.

Next, the operation of the above mentioned main heat exchanger 10 will be explained. FIG. 3 is a diagram of the main heat exchanger 10 which shows the operation at the runtime of heating operation. FIG. 4 is a diagram of the main heat exchanger 10 which shows the operation at the runtime of cooling operation. Moreover, in the drawings, dashed lines show the high pressure state of the refrigerant, full lines show the low pressure state of the refrigerant, and broken lines show the portion where the refrigerant does not ventilate.

(Heating Operation)

As shown in FIG. 3, the air mix door 54 is at the heating position which opens the heating route, and the heating valve 32 is in the open state, at the runtime of heating operation. Moreover, the bypass valve 23, the cooling valve 26, the dehumidifying valve 34, and the evaporating capacity control valve 35 are in the close state at the runtime of heating operation.

In this case, the refrigerant in high temperature and high pressure exhausted from the compressor 21 heats the air-conditioned air inside the duct 51 by the heat radiation from the heating indoor heat exchanger 55. The refrigerant which passes through the heating indoor heat exchanger 55 is expanded by the heating expansion valve 22 so as to be liquid phase rich spray state in two phases of gas-and-liquid.

Then, the refrigerant be in gas phase rich spray state in two phases of gas-and-liquid in the outdoor heat exchanger 24 by absorbing the heat from the outdoor atmosphere. The refrigerant which passes through the outdoor heat exchanger 24 flows into the gas-liquid separator 33 through the heating bypass passage 44 and the confluent portion 46. The refrigerant which flows into the gas-liquid separator 33 is separated into gas and liquid inside the gas-liquid separator, mainly gas phase of the refrigerant (liquid part of the refrigerant) is sucked to the compressor 21.

The air-conditioned air and flows into the duct 51 of the air conditioning unit 11 passes through the evaporator 53, then, passes through the heating indoor heat exchanger 55 inside the heating route. When the air-conditioned air passes through the heating indoor heat exchanger 55, the air-conditioned air is heated, then passes through the blow off port 58, and is supplied into the vehicle interior as heating.

(Cooling Operation)

As shown in FIG. 4, at the runtime of cooling operation, the air mix door 54 is at the cooling position where the air-conditioned air passing through the evaporator 53 and passing through the cooling route. Simultaneously, the bypass valve 23, the cooling valve 26, and the evaporating capacity control valve 35 are in the open state. Moreover, the heating expansion valve 22, the heating valve 32, and the dehumidifying valve 34 are in the close state.

In this case, the refrigerant in high temperature and high pressure exhausted from the compressor 21 passes through the heating indoor heat exchanger 55 and the bypass valve 23, radiates the heat to the outdoor atmosphere in the outdoor heat exchanger 24, and then flows into the cooling main passage 43. Then, the refrigerant radiates the heat again to the outdoor atmosphere in the sub-condenser 27 after the refrigerant in gas phase is recovered in the receiver tank 25. Then, the refrigerant is expanded by the cooling expansion valve 29 and is liquid phase rich spray state in two phases of gas-and-liquid. Next, the air-conditioned air inside the duct 51 is cooled by absorbing the heat in the evaporator 53.

Then, the refrigerant passing through the evaporator 53 which is gas phase rich in 2 phase of gas-and-liquid performs heat exchange in the cooling auxiliary heat exchanger 31, and then flows into the gas-liquid separator 33. The gas phase rich refrigerant which flows into the gas-liquid separator 33 is separated into gas and liquid inside of the gas liquid separator. Mainly gas phase refrigerant (gas part of the refrigerant) is sucked to the compressor 21.

The air-conditioned air which flows inside the duct 51 of the air conditioning unit 11 is cooled when passing through the evaporator 53, detours the heating indoor heat exchanger 55, and then is supplied from the air blow off port 58 to the inside of the vehicle interior.

Moreover, in the main heat exchanger 10 in the present embodiment, the heating indoor heat exchanger 55 heated by the refrigerating cycle forms a hot heat generating portion. The evaporator 53 forms a cold heat generating portion. However, the hot heat generating portion of the main heat exchanger 10 is not limited to the heating indoor heat exchanger 55 which is heated by the refrigerating cycle. The hot heat generating portion may be the one which heats the introduced air by using the heat of the cooling water of the engine, or may be the one which heats the introduced air by an electric heater and the like which use a heating element and the like.

Figure 5:
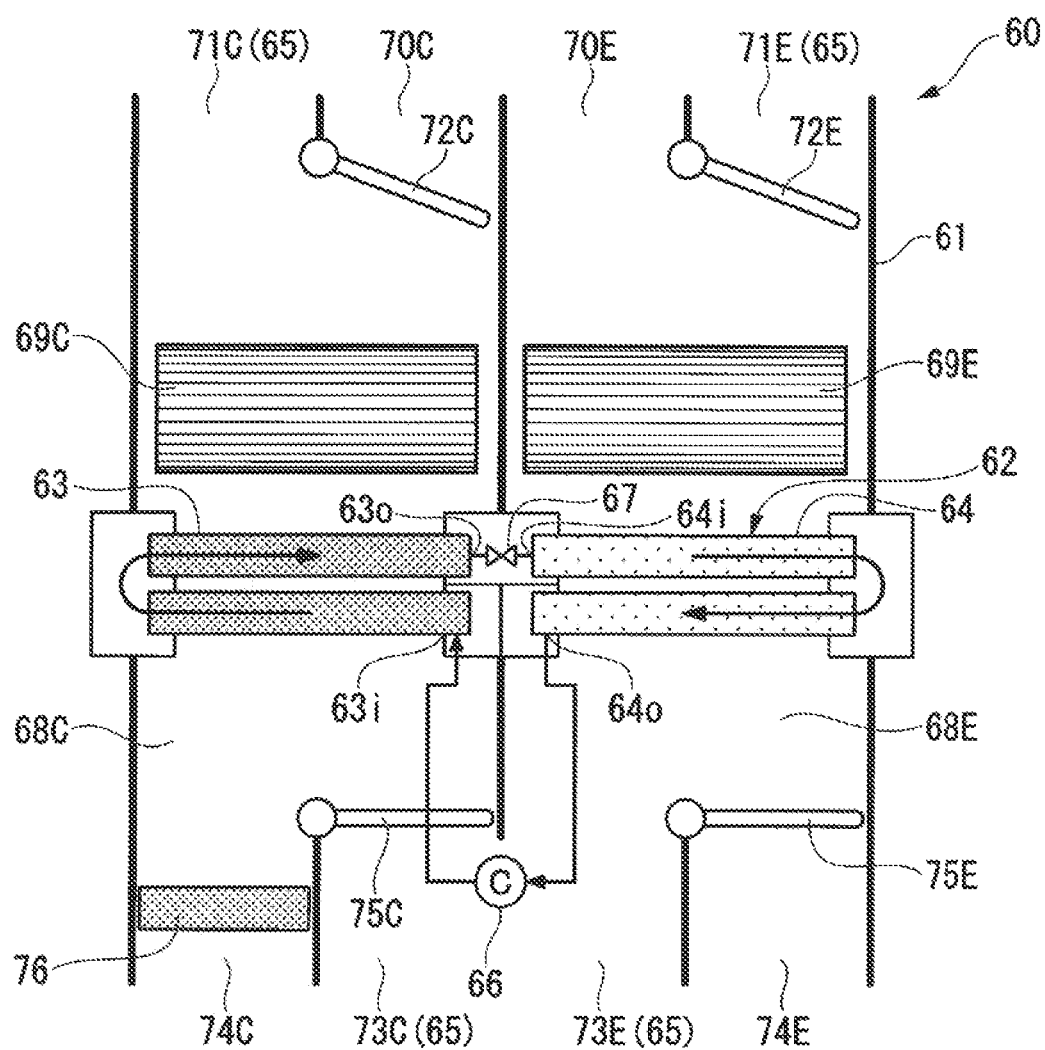
FIG. 5 is a schematically sectional view of the auxiliary heat exchanger in the one embodiment of the present disclosure.

FIG. 5 is the schematically sectional view of the auxiliary heat exchanger 60. As shown in FIG. 5, the auxiliary heat exchanger 60 has a casing 61, a heat exchanger block 62 which is disposed inside the casing 61 and in which the refrigerant can circulate.

The heat exchanger block 62 is totally formed as a block in an approximately rectangular parallelepiped shape such that a condenser 63 radiates the heat of the refrigerant ventilating inside the condenser to the periphery and an evaporator 64 absorb the heat in the periphery by the refrigerant ventilating inside the evaporator are connected each other. The heat exchanger block 62 forms a heat pump circuit.

The refrigerant inflow portion 63*i* of the condenser 63 is connected to the exhausting portion of a compressor 66. A refrigerant outflow portion 64*o* of the evaporator 64 is connected to a sucking portion of the compressor 66. A refrigerant outflow portion 63*o* of the condenser 63 and a refrigerant inflow portion 64*i* of the evaporator 64 are connected each other through an expansion valve 67. The expansion valve 67 lowers the refrigerant temperature by rapidly expanding the refrigerant flowing from the condenser 63 to the evaporator 64. As for the heat exchanger block 62, the operation of the compressor 66 makes the refrigerant circulate inside the refrigerant passage of the heat pump circuit which includes the condenser 63 and the evaporator 64.

The inside of the casing 61 of the auxiliary heat exchanger 60 is formed with an evaporator side inside passage 68C which sends the air to the heat exchange condenser 63, and an evaporator side inside passage 68E which sends the air to the heat exchanging evaporator 64. A blower 69C for sending the air is disposed in further upstream side than the condenser 63 of a condenser side inside passage 68C. An outside air introducing passage 70C and an inside air introducing passage 71C are connected in further upstream side than the installation portion of the blower 69C. An inside and outside air switching damper 72C can switch the opening state of the outside air introducing passage 70C and the inside air introducing passage 71C.

Similarly, a blower 69E for sending the air is disposed in further upstream side than the evaporator 64 of the evaporator side inside passage 68E. An outside air introducing passage 70E and an inside air introducing passage 71E are connected in further upstream side than the installation portion of the blower 69E. An inside and outside air switching damper 72E can switch the opening state of the outside air introducing passage 70E and the inside air introducing passage 71E.

Meanwhile, a vehicle outside exhausting passage 73C and a vehicle inside returning passage 74C are connected in further downstream side than the condenser 63 of the condenser side inside passage 68C. An exhaust switching damper 75C can switch the open state of the vehicle outside exhausting passage 73C and the vehicle inside returning passage 74C. For example, the vehicle inside returning passage 74C is connected to a blow off port for foot which sends the air-conditioned air to the foot side of the rear seat. Moreover, an electric heater device 76 is disposed on the peripheral portion of the inside and outside air switching damper 72C of the vehicle inside returning passage 74C.

A vehicle outside exhausting passage 73E and a vehicle inside returning passage 74E are connected in further downstream side than the evaporator 64 of the evaporator side inside passage 68E. An exhaust switching damper 75E can switch the opening state of the vehicle outside exhausting passage 73E and the vehicle inside returning passage 74E. For example, the vehicle inside returning passage 74E is connected to a ventilation blow off port which sends the air-conditioned air to the further upper direction side of the rear seat.

Another special control device 15 (see FIG. 11) which is different from the control device 13 of the main heat generator 10 controls each operation of the inside and outside air switching dampers 72C, 72E, the exhaust switching dampers 75C, 75E, the blowers 69C, 69E for sending the air, and the electric heater device 76, in the auxiliary heat exchanger 60.

Moreover, in the present embodiment, the inside air introducing passages 71C, 71E and the vehicle outside exhausting passages 73C, 73E of the auxiliary heat exchanger 60 form a part of the ventilation heat exhausting passage 65 (the exhausting passage of the indoor air) of the vehicle.

Figure 6A:
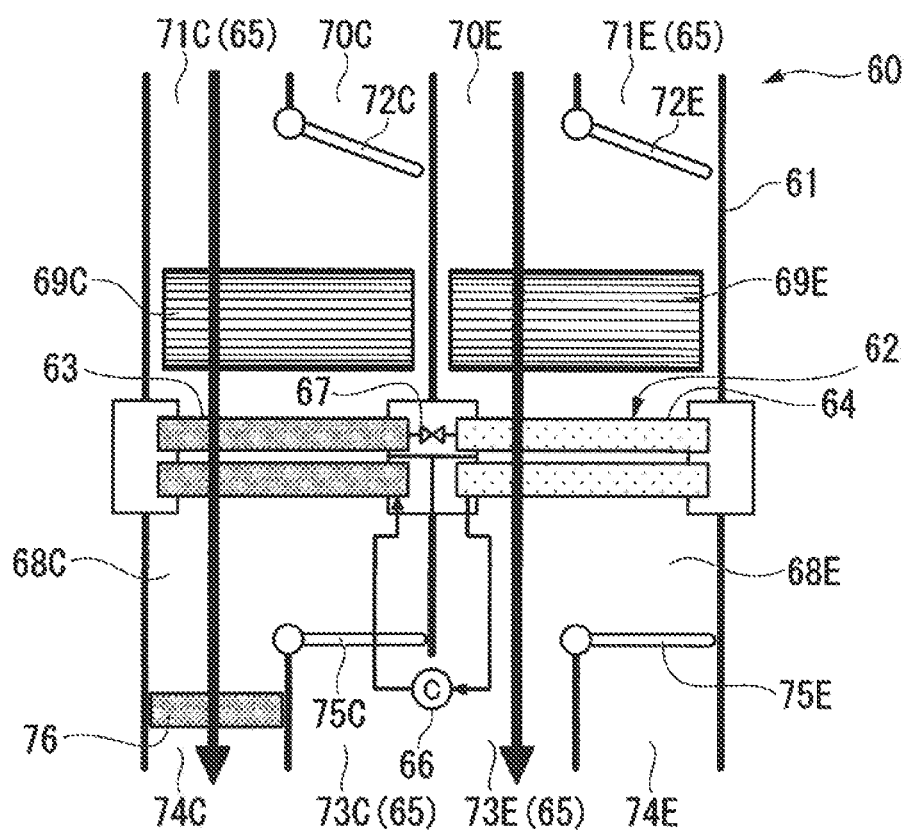
FIGS. 6(A) and 6(B) are a schematically sectional view of the auxiliary heat exchanger in the one embodiment of the present disclosure, which shows the air flow at the runtime of heating operation.
Figure 6B:
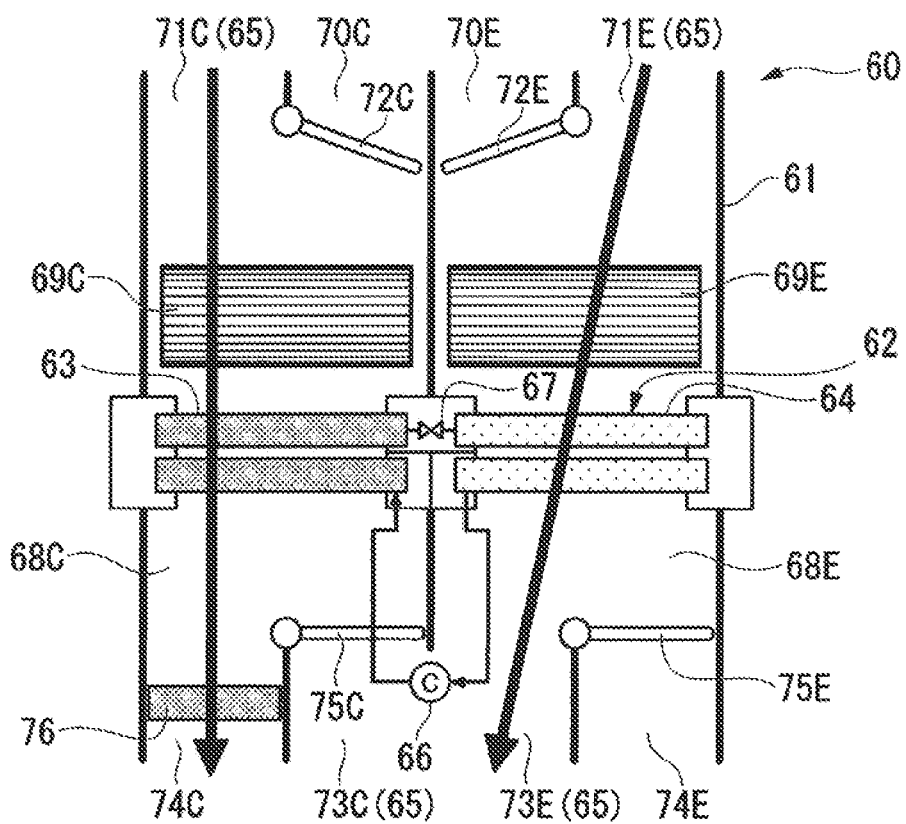
Figure 7A:
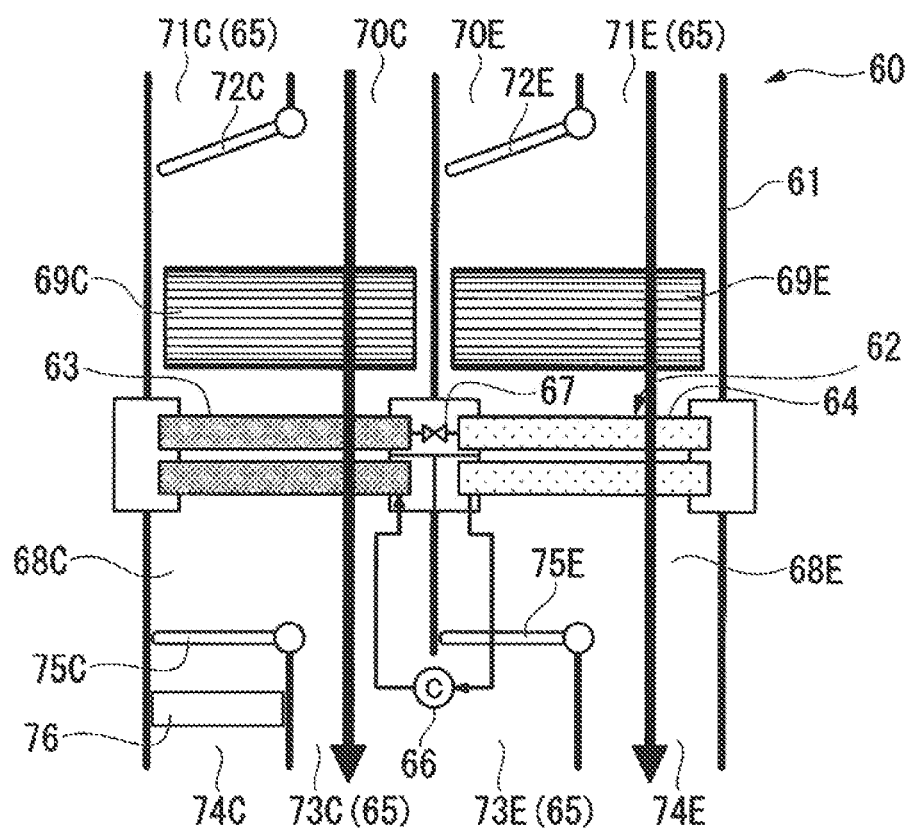
FIGS. 7(A) and 7(B) are a schematically sectional view of the auxiliary heat exchanger in the one embodiment of the present disclosure, which shows the air flow at the runtime of cooling operation.
Figure 7B:
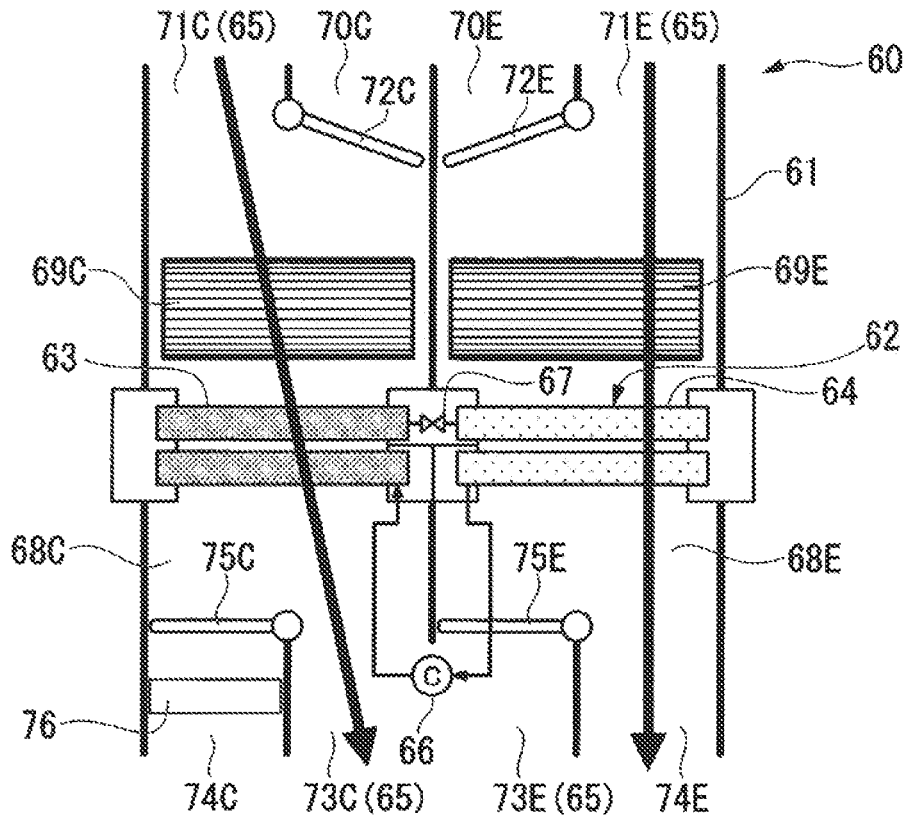

FIG. 6(A) shows the inside of the auxiliary heat exchanger 60 when the auxiliary heat exchanger 60 performs heating operation in the operation mode of the inside air circulation state. FIG. 6(B) shows the inside state of the auxiliary heat exchanger 60 when the auxiliary heat exchanger 60 performs heating operation in the operation mode of the ventilation state. FIG. 7(A) shows the inside of the auxiliary heat exchanger 60 when the auxiliary heat exchanger 60 performs cooling operation in the operation mode of the inside air circulation state. FIG. 7(B) shows the inside of the auxiliary heat exchanger 60 when the auxiliary heat exchanger 60 performs cooling operation in the operation mode of the ventilation state. Moreover, in FIG. 6, FIG. 7, arrows show the air flow which ventilates inside the auxiliary heat exchanger 60.

As for the inside and outside air switching damper 72C and the exhaust switching damper 75C which face the condenser side inside passage 68C, the open and close combination of these passages can switch the condenser 63 to the below-mentioned three kinds of heat exchanging states.

(1C) Inside Air Heat Exchanging State

The inside and outside air switching damper 72C opens the inside air introducing passage 71C, and the exhaust switching damper 75C opens the vehicle inside returning passage 74C. Accordingly, the condenser 63 performs heat exchange with the air inside the vehicle interior (see FIG. 6(A), FIG. 6(B)).

(2C) Outside Air Heat Exchanging State

The inside and outside air switching damper 72C opens the outside air introducing passage 70C, and the exhaust switching damper 75C opens the vehicle outside exhausting passage 73C. Accordingly, the condenser 63 performs heat exchange with the air outside the vehicle interior (see FIG. 7(A)).

(3C) Ventilation Heat Exchanging State

The inside and outside air switching damper 72C opens the inside air introducing passage 71C, and the exhaust switching damper 75C opens the vehicle outside exhausting passage 73C. Accordingly, the condenser 63 performs heat exchange with the ventilation air passing through the heat exhausting passage 65 and exhausted to the outside of the vehicle (see FIG. 7(B)). In the present embodiment, the inside and outside air switching damper 72C and the exhaust switching damper 75C form a condenser side heat exchange switching portion which switches the heat exchanging state of the condenser 63 to any one of above-mentioned heat exchanging states such as (1C), (2C), and (3C).

Moreover, as for the inside and outside air switching damper 72E and the exhaust switching damper 75E which face the evaporator side inside passage 68E, the open and close combination of these passages can switch the evaporator 64 to the below-mentioned three kinds of heat exchanging states.

(1E) Inside Air Heat Exchanging State

The inside and outside air switching damper 72E opens the inside air introducing passage 71E, and the exhaust switching damper 75E opens the vehicle inside returning passage 74E. Accordingly, the evaporator 64 performs heat exchange with the air inside the vehicle interior in the inside air circulation state (see FIG. 7(A), FIG. 7(B)).

(2E) Outside Air Heat Exchanging State

The inside and outside air switching damper 72E opens the outside air introducing passage 70E, and the exhaust switching damper 75E opens the vehicle outside exhausting passage 73E. Accordingly, the evaporator 64 performs heat exchange with the air outside the vehicle interior (see FIG. 6(A)).

(3E) Ventilation Heat Exchanging State

The inside and outside air switching damper 72E opens the inside air introducing passage 71E, and the exhaust switching damper 75E opens the vehicle outside exhausting passage 73E. Accordingly, the evaporator 64 performs heat exchange with the ventilation air passing through the heat exhausting passage 65 and exhausted to the outside of the vehicle (see FIG. 6(B)).

In the present embodiment, the inside and outside air switching damper 72E and the exhaust switching damper 75E forms a heat exchange switching portion in switch evaporator side which can switch the heat exchanging state of the evaporator 64 to any one of above-mentioned heat exchanging states such as (1E), (2E), and (3E).

Figure 8:
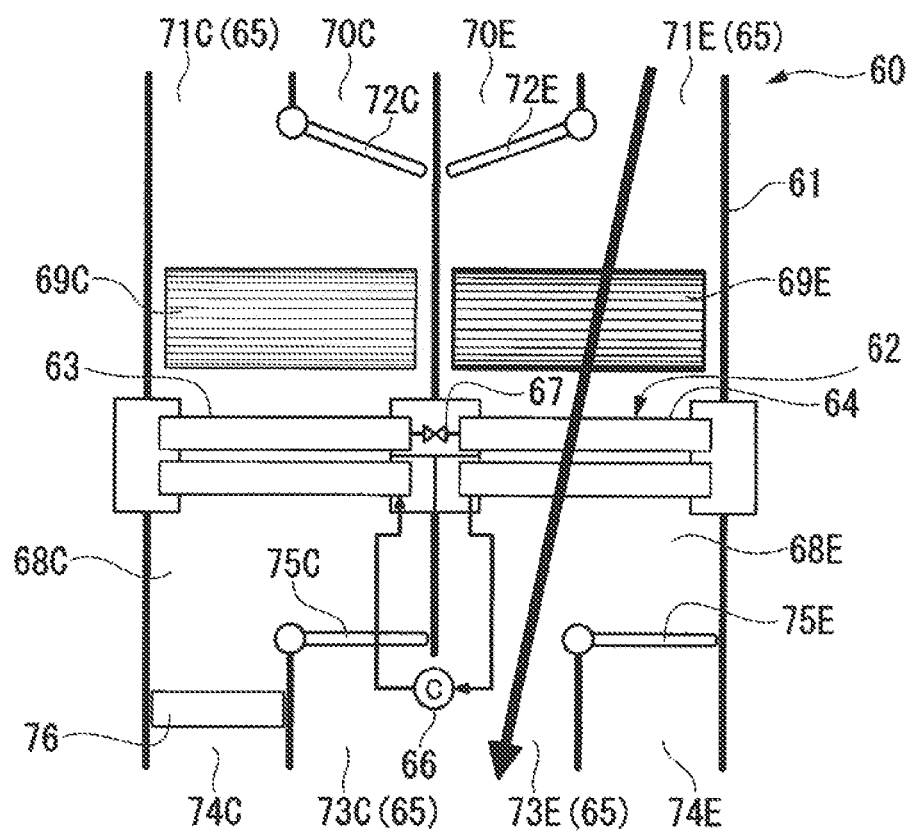
FIG. 8 is a schematically sectional view of the auxiliary heat exchanger in the one embodiment of the present disclosure, which shows the air flow at the runtime of ventilation without cooling and heating.

Moreover, FIG. 8 shows the inside of the auxiliary heat exchanger 60 when the auxiliary heat exchanger ventilates the inside of the vehicle interior in the operation mode without cooling and heating. In this operation mode, the inside and outside air switching damper 72E opens the inside air introducing passage 71E, and the exhaust switching damper 75E opens the vehicle outside exhausting passage 73E. Accordingly, the ventilation air inside the vehicle interior passes through the evaporator 64 and is exhausted to the vehicle outside exhausting passage 73E.

Figure 9A:
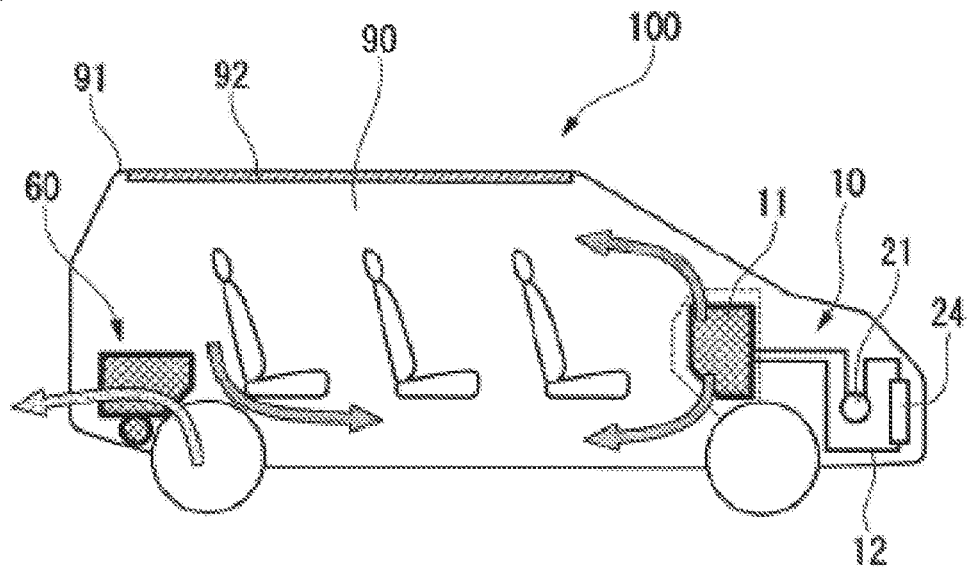
FIGS. 9(A) and 9(B) are a schematically sectional view of the vehicle which adopts a vehicular air conditioner in the one embodiment in the present disclosure, which shows the air flow at the runtime of heating operation.
Figure 9B:
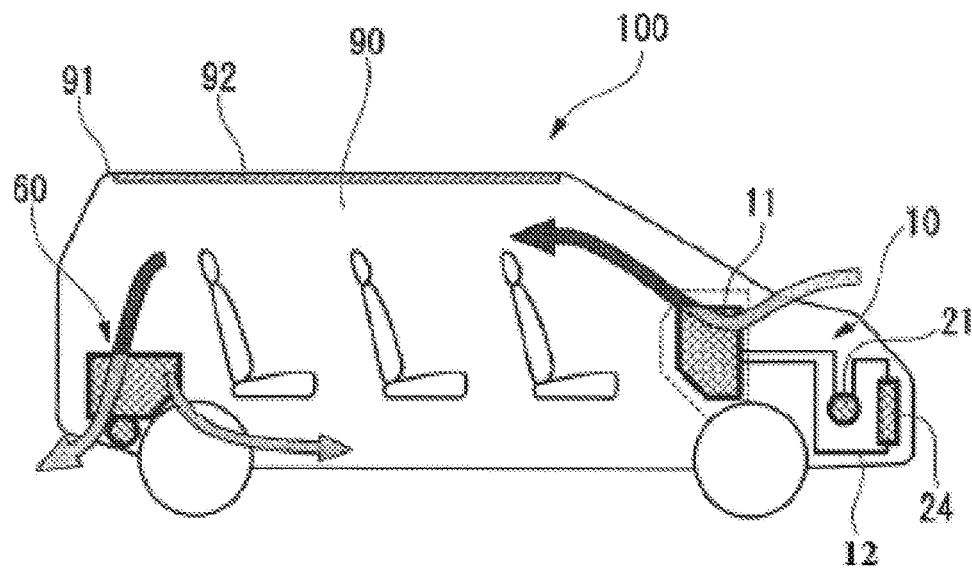
Figure 10A:
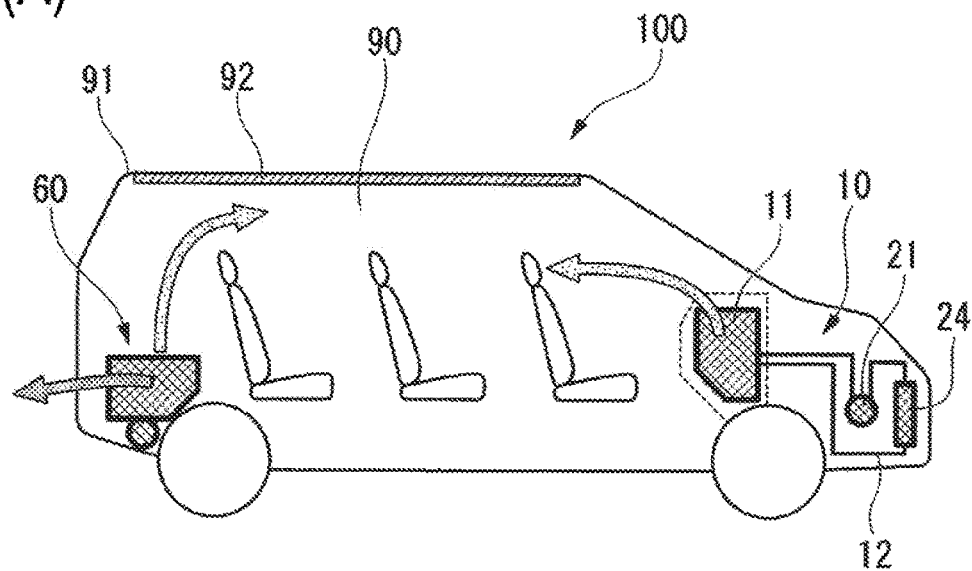
FIGS. 10(A) and 10(B) are a schematically sectional view of the vehicle which adopts a vehicular air conditioner in the one embodiment in the present disclosure, which shows the air flow at the runtime of cooling operation.
Figure 10B:
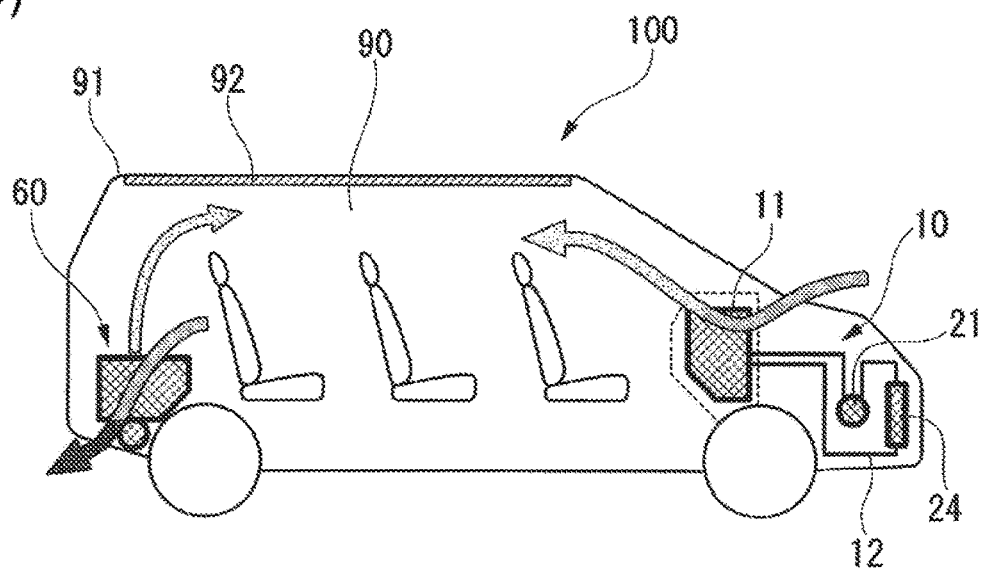

The control device 15 can appropriately switch the inside and outside air switching dampers 72C, 72E and the exhaust switching dampers 75C, 75E in the auxiliary heat exchanger 60, according to the operation mode of the vehicular air conditioner 1. FIG. 9(A) shows the air flow of the main heat exchanger 10 and the auxiliary heat exchanger 60 in the inside air circulation heating mode (outside air heat absorbing mode). FIG. 9(B) shows the air flow of the main heat exchanger 10 and the auxiliary heat exchanger 60 in the ventilation heating mode (ventilation heat recovering mode). Moreover, FIG. 10(A) shows the air flow of the main heat exchanger 10 and the auxiliary heat exchanger 60 in the inside air circulation cooling mode (outside air heat exhausting mode). FIG. 10(B) shows the air flow of the main heat exchanger 10 and the auxiliary heat exchanger 60 in the ventilation cooling mode (ventilation heat recovering mode).

Hereinafter, the state and the air flow in each operation mode of the main heat exchanger 10 and the auxiliary heat exchanger 60 will be explained.

<Inside Air Circulation Heating Mode>

In the inside air circulation heating mode, the main heat exchanger 10 performs heating operation in the inside air circulation state, namely, the switching damper 37 (see FIG. 2) of the air conditioning unit 11 switches the passage of the introduced air to the indoor passage 20 side.

In this case, the control device 15 controls the auxiliary heat exchanger 60. In order that the condenser 63 shifts to the inside air heat exchanging state as shown in FIG. 6(A), the inside and outside air switching damper 72C of the condenser 63 side opens the inside air introducing passage 71C, and simultaneously, the exhaust switching damper 75C opens the vehicle inside returning passage 74C. The evaporator 64 side inside and outside air switching damper 72E opens the outside air introducing passage 70E, and simultaneously, the exhaust switching damper 75E opens the vehicle outside exhausting passage 73E.

Accordingly, the evaporator 64 absorbs the heat from the outside air, and the condenser 63 heats the air inside the vehicle interior in the auxiliary heat exchanger 60. Then, FIG. 9(A) shows the air flow.

<Ventilation Heating Mode>

In the ventilation heating mode, the main heat exchanger 10 performs heating operation in the outside air introducing state, namely, the switching damper 37 (see FIG. 2) of the air conditioning unit 11 switches the passage of the introduced air to the outdoor passage 36 side.

In this case, the control device 15 controls the auxiliary heat exchanger 60. In order that the condenser 63 shifts to the inside air heat exchanging state as shown in FIG. 6(B), the condenser 63 side inside and outside air switching damper 72C opens the inside air introducing passage 71C, and simultaneously, the exhaust switching damper 75C opens the vehicle inside returning passage 74C. The evaporator 64 side inside and outside air switching damper 72E opens the inside air introducing passage 71E, and simultaneously, the exhaust switching damper 75E opens the vehicle outside exhausting passage 73E.

Accordingly, the evaporator 64 absorbs the heat from the ventilation air in relatively high temperature passing through the heat exhausting passage 65 and exhausted from the inside of the vehicle interior in the auxiliary heat exchanger 60. The condenser 63 heats the air inside the vehicle interior.

Then, FIG. 9(B) shows the air flow. When the temperature of the outside air is low, the temperature of the ventilation air exhausted from the inside of the vehicle interior becomes relatively higher than that of the outside air, which enables the evaporator 64 to efficiently absorb the heat. Accordingly, the auxiliary heat exchanger 60 enhances the heating efficiency.

<Inside Air Circulation Cooling Mode>

In the inside air circulation cooling mode, the main heat exchanger 10 performs cooling operation in the inside air circulation state, namely, the switching damper 37 (see FIG. 2) of the air conditioning unit 11 switches a passage of the introduced air to the indoor passage 20 side.

In this case, the control device 15 controls the auxiliary heat exchanger 60. In order that the evaporator 64 shifts to the inside air heat exchanging state as shown in FIG. 7(A), the evaporator 64 side inside and outside air switching damper 72E opens the inside air introducing passage 71E, and simultaneously, the exhaust switching damper 75E opens the vehicle inside returning passage 74E. The inside and outside air switching damper 72C in the condenser 63 side opens the outside air introducing passage 70C, and simultaneously the exhaust switching damper 75C opens the vehicle outside exhausting passage 73C.

Accordingly, the condenser 63 radiates the heat to the outside air, and the evaporator 64 cools the air inside the vehicle interior in the auxiliary heat exchanger 60. Then, FIG. 10(A) shows the air flow.

<Ventilation Cooling Mode>

In the ventilation cooling mode, the main heat exchanger 10 performs cooling operation in the outside air introducing state, namely, the switching damper 37 (see FIG. 2) of the air conditioning unit 11 switches a passage of the introduced air to the outdoor passage 36 side.

In this case, the control device 15 controls the auxiliary heat exchanger 60. In order that the evaporator 64 shifts to the inside air heat exchanging state, as shown in FIG. 7(B), the evaporator 64 side inside and outside air switching damper 72E opens the inside air introducing passage 71E, and simultaneously, the exhaust switching damper 75E opens the vehicle inside returning passage 74E. The condenser 63 side inside and outside air switching damper 72C opens the inside air introducing passage 71C, and simultaneously the exhaust switching damper 75C opens the vehicle outside exhausting passage 73C.

Accordingly, in the auxiliary heat exchanger 60, the condenser 63 radiates the heat of the ventilation air in relatively low temperature which passes through the heat exhausting passage 65 and exhausted from the inside of the vehicle interior, the evaporator 64 cools the air inside the vehicle interior. Then, FIG. 10(B) shows the air flow.

When the temperature of the outside air is high, temperature of the ventilation air exhausted from the inside of the vehicle interior is relatively lower than that of the outside air, which enables the condenser 63 to efficiently radiate the heat. Accordingly, the auxiliary heat exchanger 60 enhances the cooling efficiency.

Figure 11:
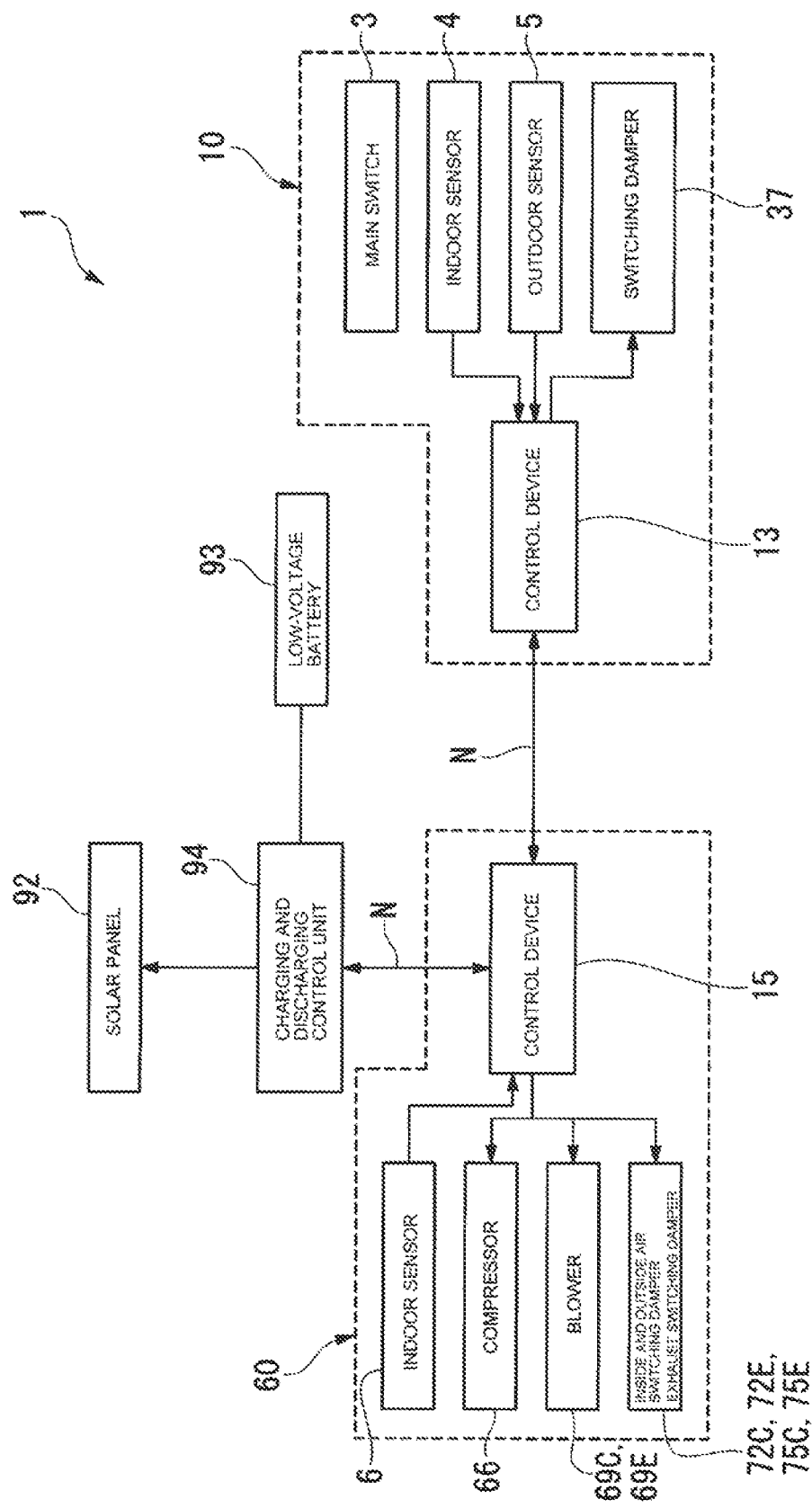
FIG. 11 is a system diagram of the vehicular air conditioner in the one embodiment of the present disclosure.

FIG. 11 is a system diagram of the vehicular air conditioner 1 in the present embodiment.

The vehicular air conditioner 1 is configured such that an onboard network system N facilitates the intercommunication among the control device 13 of the main heat exchanger 10, the control device 15 of the auxiliary heat exchanger 60, and a charging and discharging control unit 94 which controls charging and discharging of a low voltage battery 93.

The control device 13 of the main heat exchanger 10 receives operation commands by the occupant and input signals from sensors disposed on the front portion of the vehicle including an indoor sensor 4 and an outdoor sensor 5 and the like, and controls other apparatuses including the introduced air switching damper 37 and a compressor 66 and the like. Moreover, a sign 3 in FIG. 11 shows a main switch of the vehicular air conditioner 1.

The control device 15 of the auxiliary heat exchanger 60 receives input signals from sensors disposed on the rear portion of the vehicle including an indoor sensor 6 and the like, and controls the compressor 66, the blower 69C, 69E for sending the air, the inside and outside air switching dampers 72C, 72E, the exhaust switching dampers 75C, 75E and the like.

The charging and discharging control unit 94 receives charging and discharging state signals from the low voltage battery 93, controls charging and discharging from the solar panel 92 to the low voltage battery 93. Simultaneously, the charging and discharging control unit receives charging and discharging state signals from the low voltage battery 93 and detecting signals from an unillustrated solar radiation sensor, and controls the power usage of the auxiliary heat exchanger 60 and other low-voltage apparatuses.

Moreover, the vehicular air conditioner 1 related to the present embodiment has a function of prior ventilation, prior cooling, and prior heating inside the vehicle interior before the occupant gets on the vehicle (before an ignition switch is turned ON).

Figure 12A:
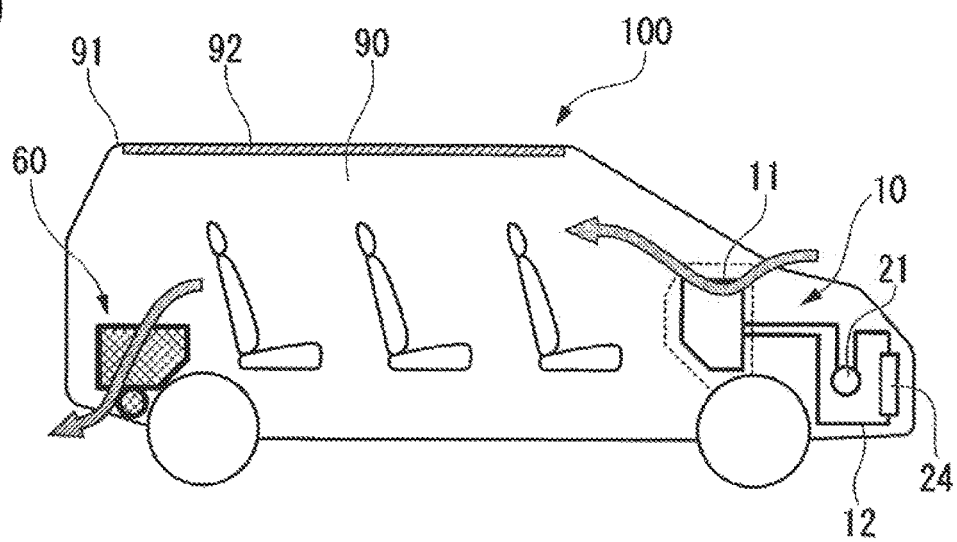
FIGS. 12(A), 12(B) and 12(C) are a schematically sectional view of the vehicle which adopts a vehicular air conditioner in the one embodiment in the present disclosure, which shows the air flow when prior air-conditioning is performed before an occupant gets on the vehicle.
Figure 12B:
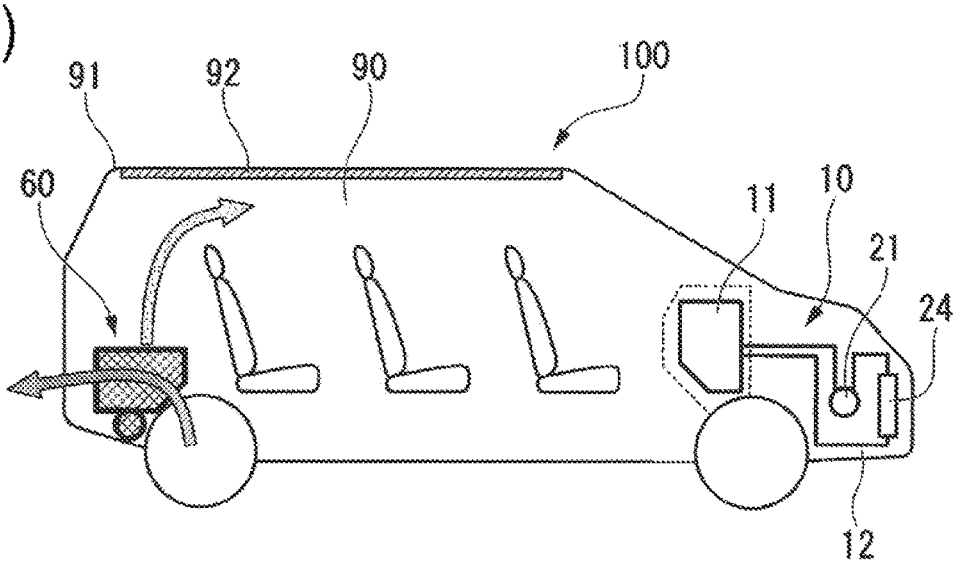
Figure 12C:
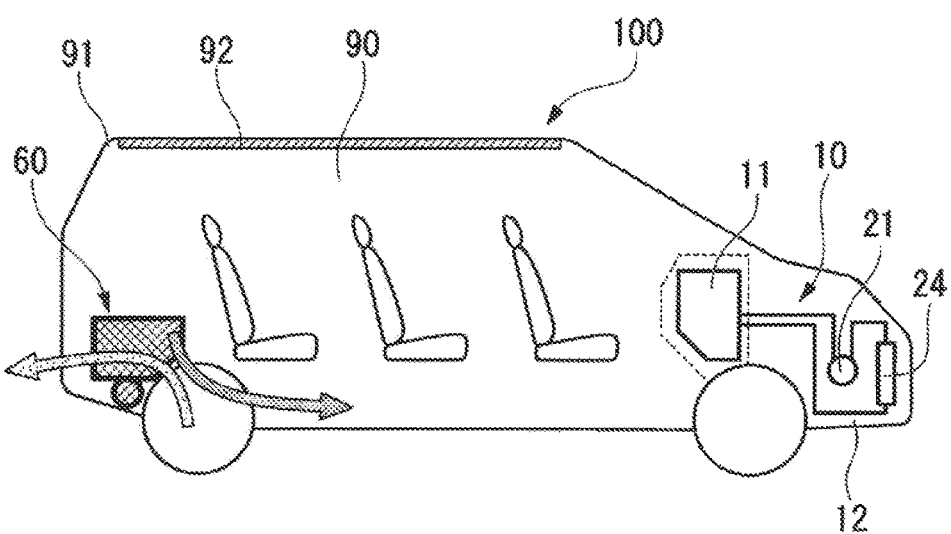

FIG. 12(A) shows the operational state of the main heat exchanger 10 and the auxiliary heat exchanger 60 at the runtime of prior ventilation by the vehicular air conditioner 1. Moreover, FIG. 12(B) shows the operational state of the main heat exchanger 10 and the auxiliary heat exchanger 60 at the runtime of prior cooling by the vehicular air conditioner 1, FIG. 12(C) shows the operational state of the main heat exchanger 10 and the auxiliary heat exchanger 60 at the runtime of prior heating by the vehicular air conditioner 1.

Figure 13:
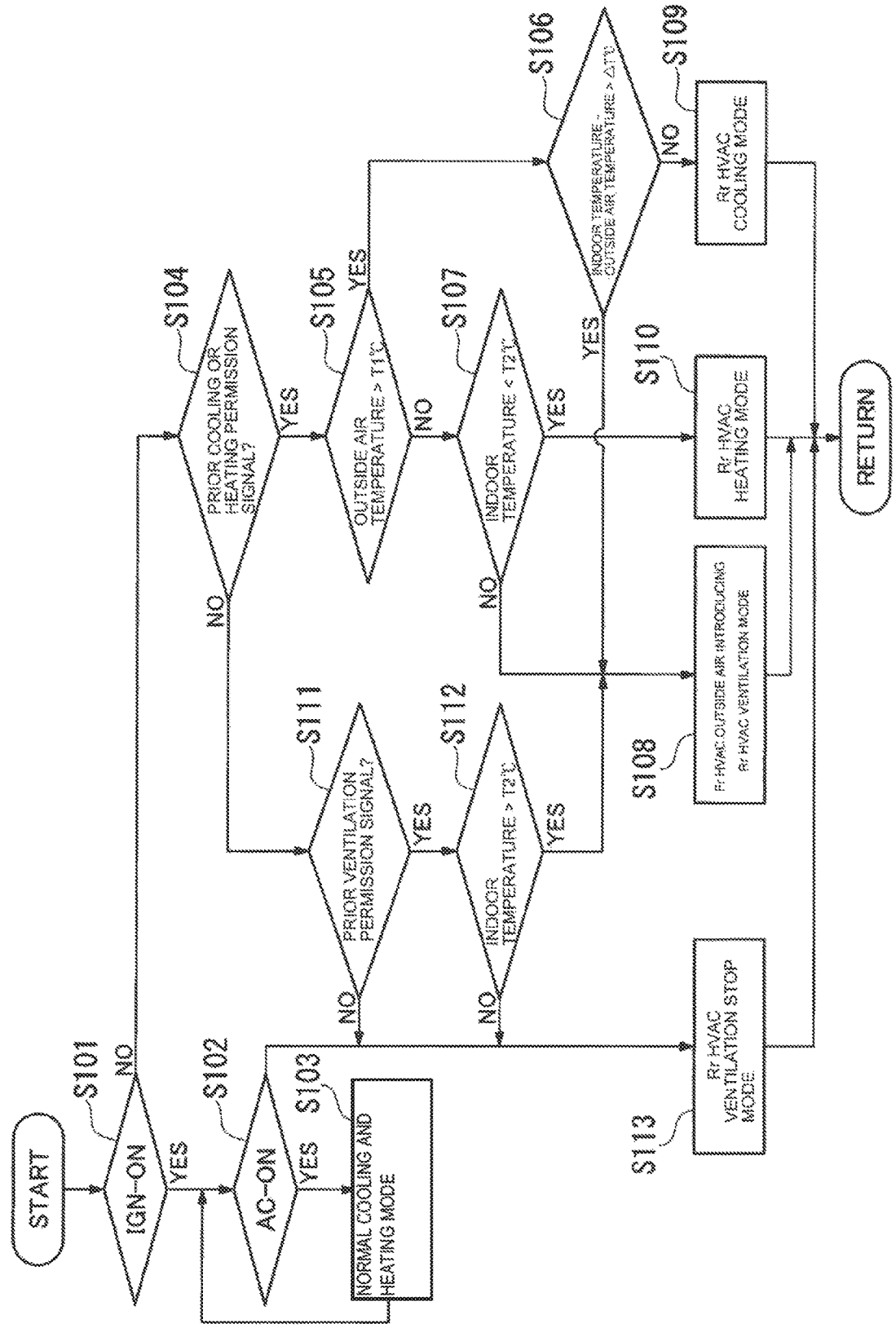
FIG. 13 is a flowchart which shows a part of the control of the vehicular air conditioner in the one embodiment of the present disclosure.

Hereinafter, examples of prior ventilation, prior cooling or prior heating by the vehicular air conditioner 1 will be explained with reference to a flowchart shown in FIG. 13.

A step S101 determines whether the ignition switch is turned ON or not. If the ignition switch is tuned ON, the procedure goes to a step S102. If a main switch 3 of the vehicular air conditioner 1 is tuned ON, the procedure goes to step S103 and shifts to the normal heating and cooling mode.

In the step S101, if the ignition switch is turned OFF, the procedure goes to a step S104 which determines whether there is a permission signal for prior cooling or prior heating, or not. For example, the permission signals for prior cooling or prior heating uses a remained capacity signal of the low voltage battery 93 and a detecting signal for the solar radiation sensor. Namely, using these signals enables to determine whether there still remains enough electric power of the low voltage battery 93 to continue prior cooling or prior heating, or not, and whether there is enough solar power generation amount or not at present.

If the step S104 determines that there is a permission signal for prior cooling or prior heating, the procedure goes to step S105. If the step determines there is no permission signal for prior cooling or prior heating, the procedure goes to step S111. The step S105 determines whether the outside air temperature is higher than set temperature or the preset temperature T1° C. or not. If the outside air temperature is higher than the set temperature T1° C., the procedure goes to step S106. If the outside air temperature is not higher, the procedure goes to step S107.

The step S106 determines whether a difference between the indoor temperature and the outside air temperature is higher than a set temperature difference $\Delta T°$ C. or not. If the step S106 determines the difference between the indoor temperature and the outside air temperature is not higher than the set temperature difference $\Delta T°$ C., the procedure goes to a step S109, and the auxiliary heat exchanger 60 on the rear portion of the vehicle performs cooling (see FIG. 12B)). The auxiliary heat exchanger 60 is configured such that the condenser 63 and the evaporator 64 are formed in the integral block, the inside refrigerant passages is simple and short, which enables to perform cooling or heating with small energy consumption.

Meanwhile, if the step S106 determines the difference between the indoor temperature and the outside stir temperature is higher than the set temperature difference $\Delta T°$ C., the procedure goes to a step S108, and the outside air is introduced from the main heat exchanger 10 on the front portion of the vehicle, then the auxiliary heat exchanger 60 on the rear portion of the vehicle shifts to the ventilation mode (see FIG. 12(A)). Accordingly, the inside of the vehicle interior is ventilated. Therefore, if the difference between the indoor temperature and the outside air temperature is larger than the set temperature difference or the preset temperature difference $\Delta T°$ C., and the prior ventilation operation is performed to lower the temperature inside the vehicle interior, and then shifts to the cooling operation.

Moreover, if the outside air temperature is equal to or lower than the set temperature T1° C., the procedure goes to the step S107, the step S107 determines whether the indoor temperature is lower than a set temperature T2° C. If the indoor temperature is lower than the set temperature T2° C., the procedure goes to a step S110, and the auxiliary hear exchanger 60 on the rear portion of the vehicle performs heating (see FIG. 12(C)).

Moreover, if the indoor temperature is higher than the set temperature T2° C., the procedure goes to the step S108, and the outside air is introduced from the main heat exchanger 10 on the front portion of the vehicle, then the auxiliary heat exchanger 60 on the rear portion of the vehicle shifts to the ventilation mode (see FIG. 12(A)). Accordingly, the inside of the vehicle interior is ventilated.

In the step S104, if there is no permission signal for prior cooling or prior heating and the procedure goes to the step S111, and the step S111 determines whether there is a permission signal for prior ventilation or not (for example, whether the electric power of the low voltage battery 93 remains more than a certain level or not, and whether there is more than a certain level of solar radiation or not). In the step S111, if there is a permission signal for prior ventilation, the procedure goes to a step S112. If there is no permission signal, the procedure goes to a step S113 to stop (no-op) the ventilation mode of the auxiliary heat exchanger 60.

In the step S111, if there is a permission signal for prior cooling or prior heating and the procedure goes to the step S112, the step S112 determines whether the indoor temperature is higher than the set temperature T2° C. or not. If the step S112 determines the indoor temperature is higher than the set temperature T2° C., the procedure goes to the step S108, and the outside air is introduced from the main heat exchanger 10 on the front portion of the vehicle, then the auxiliary heat exchanger 60 on the rear portion of the vehicle 10 shifts to the ventilation mode (see FIG. 12(A)). Accordingly, the inside of the vehicle interior is ventilated.

Moreover, the step S112 determines that the indoor temperature is equal to or lower than the set temperature T2° C., the procedure goes to the step S113 to stop (no-op) the ventilation mode of the auxiliary heat exchanger 60.

Moreover, if there is a demand for prior cooling or prior heating (an instruction for prior cooling or prior heating) from a user, the main heat exchanger 10 may be interlocked with the auxiliary heat exchanger 60. In this case, it is preferable to preferentially lower the output of the main heat exchanger 10 on the condition that the remained capacity of the low voltage battery 93 is more than a certain level, and the temperature of the inside of the vehicle interior becomes stable (the auxiliary heat exchanger 60 preferentially operates). Accordingly, it is possible to save the power of the vehicle.

As mentioned above, in the vehicular air conditioner 1 related to the present embodiment, at the runtime of operation in the ventilation heating mode, the heating indoor heat exchanger 55 of the main heat exchanger 10 introduces the outside air, rises the temperature of the air, and sends the air to the inside of the vehicle interior. Meanwhile, the condenser 63 of the auxiliary heat exchanger 60 shift to the inside air heat exchanging state and the evaporator 64 of the auxiliary heat exchanger 60 shift to the ventilation heat exchanging state, which exhausts a part of the heated air inside the vehicle interior from the heat exhausting passage 65 to the outside of the vehicle. Simultaneously, the auxiliary heat exchanger 60 recovers the heat of the heat exhausting passage 65 and can efficiently heat the air inside the vehicle interior.

Moreover, in the vehicular air conditioner 1 related to the present embodiment, at the runtime of the operation in the ventilation cooling mode, the evaporator 53 of the main heat exchanger 10 introduces the outside air, cools the air, and sends the cooled air to the inside of the vehicle interior. Meanwhile, the evaporator 64 of the auxiliary heat exchanger 60 shift to the inside air heat exchanging state, and the condenser 63 of the auxiliary heat exchanger 60 shift to the ventilation heat exchanging state, which exhausts a part of cold heat air inside the vehicle interior from the heat exhausting passage 65 to the outside of the vehicle. Simultaneously, the auxiliary heat exchanger 60 recovers the cold neat of the heat exhausting passage 65 and can efficiently cool the air inside the vehicle interior.

The vehicular air conditioner 1 related to the present embodiment is configured such that the auxiliary heat exchanger 60 is completely separated from the main heat exchanger 10 and is not connected with a refrigerant piping. Accordingly, it is possible to suppress the pressure loss and the heat loss in the refrigerant piping, and simultaneously to recover the heat energy of the heat exhausting passage 65 in the ventilation heating mode or in the ventilation cooling mode at any runtime of heating operation or cooling operation. Therefore, the energy utilization efficiency can be enhanced by adopting the vehicular air conditioner 1 related to the present embodiment.

Moreover, the vehicular air conditioner 1 related to the present embodiment is configured such that in the inside air circulation heating mode when the main heat exchanger 10 introduces the inside air, the condenser 63 of the auxiliary heat exchanger 60 can operate in the inside air heat exchanging state, and simultaneously the evaporator 64 can operate in the outside air heat exchanging state. Furthermore, in the inside air circulation cooling mode when the main heat exchanger 10 introduces the inside air, the evaporator 64 of the auxiliary heat exchanger 60 can operate in the inside air heat exchanging state, and simultaneously the condenser 63 can operate in the outside air heat exchanging state. Therefore, when the vehicular air conditioner 1 related to the present embodiment is adopted, it is possible to properly use ventilation heating or inside air circulation heating, and ventilation cooling or inside air circulation cooling depending on the operational condition.

Furthermore, the vehicular air conditioner 1 related to the present embodiment is configured such that the evaporator 64 of the auxiliary heat exchanger 60 can freely switch the outside air heat exchanging state and the ventilation heat exchanging state. For example, the evaporator 64 is frosted by the cold air outside the vehicle, when the evaporator operates in the inside air circulation heating mode at cold time. It is possible to defrost with the hot heat inside the vehicle interior by switching the evaporator 64 to the ventilation heat exchanging state.

Moreover, in the case of the vehicular air conditioner 1 related to the present embodiment, the heater device 76 is disposed inside the vehicle inside returning passage 74C in the condenser 63 of the auxiliary heat exchanger 60 side. Accordingly, the heater device 76 operates as necessary at the runtime of heating operation, which can enhance the heating effect of the auxiliary heat exchanger 60.

Furthermore, in the present embodiment, due to the fact that the heater device 76 is disposed inside the condenser 63 side vehicle inside returning passage 74C, the air passing through the condenser 63 at the time of cooling operation can prevent from hitting the heater device 76, and suppresses the increase of the flow resistance by the heater device 76. Therefore, adopting this configuration can decrease the energy consumption of the blower 69C for sending the air.

Moreover, the vehicular air conditioner 1 related to the present embodiment has the auxiliary heat exchanger 60 with the heat pump circuit which is completely separated from the main heat exchanger 10. Accordingly, for example, the main heat exchanger 10 performs defrost heating operation, in addition, the auxiliary heat exchanger 60 performs heating operation at the runtime of defrost heating operation, the auxiliary heat exchanger 60 supplies the decrease associated with the dehumidification, in the heat amount of the flow in the main heat exchanger 10 the temperature inside the vehicle interior can be kept comfortably.

Moreover, the present invention is not limited to the above-mentioned embodiment. Various modifications are possible without departing the scope of the aim.

For example, in the above-mentioned embodiment, a hot heat generating portion of the main heat exchanger is configured with the heat pump circuit. The hot heat generating portion of the main heat exchanger can use a water heater and high-voltage PTC heater and the like. In this case, performing the combined operation with the auxiliary heat exchanger in a same way as the above-mentioned embodiment enables to enhance the energy utilization efficiency and to reduce the energy consumption. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:
1. A vehicular air conditioner comprising:
a main heat exchanger;
an auxiliary heat exchanger;
a first controller configured to control said main heat exchanger;
a second controller configured to control said auxiliary heat exchanger, the main heat exchanger comprising:
  a hot heat generating portion;
  a cold heat generating portion; and
  an introduced air switching portion configured to switch between inside air inside a vehicle interior and outside air outside the vehicle interior as air introduced to at least one of said hot heat generating portion and said cold heat generating portion,
  the main heat exchanger being configured to cause the introduced air to pass through at least one of said hot heat generating portion and said cold heat generating portion to flow into the vehicle interior, the main heat exchanger having a plurality of operation modes to be selected,
the auxiliary heat exchanger comprising:
  a condenser configured to radiate heat to the surroundings from refrigerant exhausted from a compressor; and
  an evaporator configured to absorb heat from the surroundings to the refrigerant exhausted from said condenser and expanded by an expansion valve,
  the condenser and the evaporator constituting an integral block,
  wherein the vehicle comprises a ventilation heat exhausting passage configured to exhaust the inside air from the inside of the vehicle to the outside of the vehicle as ventilation air, the auxiliary heat exchanger being separate from said main heat exchanger and constituting a part of the ventilation heat exhausting passage,
  the auxiliary heat exchanger configured to selectively perform heat exchange of the inside air with one of said condenser and said evaporator depending on the operation mode of the main heat exchanger, and to exhaust air-conditioned air to the vehicle interior,
wherein said auxiliary heat exchanger further comprises:
a condenser heat exchange switching portion configured to selectively switch among an inside air heat exchanging state in which said condenser performs heat exchange with the inside air inside the vehicle interior; an outside air heat exchanging state in which said condenser performs heat exchange with the outside air outside the vehicle interior; and a ventilation heat exchanging state in which said condenser performs heat exchange with the ventilation air exhausted to the outside of the vehicle interior through said heat exhausting passage, and
an evaporator heat exchange switching portion configured to selectively switch among an inside air heat exchanging state in which said evaporator performs heat exchange with the inside air inside the vehicle interior; an outside air heat exchanging state in which said evaporator performs heat exchange with the outside air outside the vehicle interior; and a ventilation heat exchanging state in which said evaporator performs heat exchange with the ventilation air exhausted from the inside of the vehicle interior to the outside of the vehicle interior through said heat exhausting passage, and
wherein said second controller is configured to control said condenser heat exchange switching portion and the evaporator heat exchange switching portion depending on the operation mode of the main heat exchanger,
wherein when the operation mode of the main heat exchanger is a mode performing heating with said introduced air switching portion of said main heat exchanger introducing the inside air, said second controller controls said condenser heat exchange switching portion such that said condenser shifts to said inside air heat exchanging state, and controls said evaporator heat exchange switching portion such that said evaporator shifts to said outside air heat exchanging state.

2. The vehicular air conditioner according to claim 1, wherein when the operation mode of the main heat exchanger is a mode performing heating with said introduced air switching portion of said main heat exchanger introducing the outside air, said second controller controls said condenser heat exchange switching portion such that said condenser shifts to said inside air heat exchanging state, and controls said evaporator heat exchange switching portion such that said evaporator shifts to said ventilation heat exchanging state.

3. The vehicular air conditioner according to claim 2, wherein, when the operation mode of the main heat exchanger is the mode performing heating with said introduced air switching portion of said main heat exchanger introducing the outside air, the evaporator of the auxiliary heat exchanger absorbs heat from the ventilation air exhausted from the inside of the vehicle interior to the outside of the vehicle interior through said heat exhausting passage.

4. The vehicular air conditioner according to claim 1, wherein when the operation mode of the main heat exchanger is a mode performing cooling with said introduced air switching portion of said main heat exchanger introducing the inside air, said second controller controls said evaporator heat exchange switching portion such that said evaporator shifts to said inside air heat exchanging state, and controls said condenser heat exchange switching portion such that said condenser shifts to said outside air heat exchanging state.

5. The vehicular air conditioner according to claim 1, wherein when the operation mode of the main heat exchanger is a mode performing cooling with said introduced air switching portion of said main heat exchanger introducing the outside air, said second controller controls said evaporator heat exchange switching portion such that said evaporator shifts to said inside air heat exchanging state, and controls said condenser heat exchange switching portion such that said condenser shifts to said ventilation heat exchanging state.

6. The vehicular air conditioner according to claim 5, wherein, when the operation mode of the main heat exchanger is the mode performing cooling with said introduced air switching portion of said main heat exchanger introducing the outside air, the condenser of the auxiliary heat exchanger radiates heat to the ventilation air exhausted to the outside of the vehicle interior through said heat exhausting passage.

7. The vehicular air conditioner according to claim 1, wherein the auxiliary heat exchanger includes a heat pump circuit independent from and disconnected from a heat pump circuit of the main heat exchanger.

8. The vehicular air conditioner according to claim 1, wherein the auxiliary heat exchanger includes a refrigerant piping circuit independent from and disconnected from a refrigerant piping circuit of the main heat exchanger.

* * * * *